(12) United States Patent
Longcor

(10) Patent No.: US 12,503,479 B2
(45) Date of Patent: *Dec. 23, 2025

(54) PHOSPHOLIPID-FLAVAGLINE CONJUGATES AND METHODS OF USING THE SAME FOR TARGETED CANCER THERAPY

(71) Applicant: Cellectar Biosciences, Inc., Madison, WI (US)

(72) Inventor: Jarrod Longcor, East Haven, CT (US)

(73) Assignee: CELLECTAR BIOSCIENCES, INC., Madison, WI (US)

( * ) Notice: Subject to any disclaimer, the term of this patent is extended or adjusted under 35 U.S.C. 154(b) by 1152 days.

This patent is subject to a terminal disclaimer.

(21) Appl. No.: 17/044,757

(22) PCT Filed: Apr. 10, 2019

(86) PCT No.: PCT/US2019/026853
§ 371 (c)(1),
(2) Date: Oct. 1, 2020

(87) PCT Pub. No.: WO2019/200017
PCT Pub. Date: Oct. 17, 2019

(65) Prior Publication Data
US 2021/0163513 A1    Jun. 3, 2021

Related U.S. Application Data

(60) Provisional application No. 62/655,659, filed on Apr. 10, 2018.

(51) Int. Cl.
C07F 9/09         (2006.01)
A61K 47/54       (2017.01)
A61P 35/00       (2006.01)

(52) U.S. Cl.
CPC ............. *C07F 9/09* (2013.01); *A61K 47/544* (2017.08); *A61P 35/00* (2018.01)

(58) Field of Classification Search
None
See application file for complete search history.

(56) References Cited

U.S. PATENT DOCUMENTS

| 4,938,949 A | 7/1990 | Borch et al. |
| 4,965,391 A | 10/1990 | Counsell et al. |

(Continued)

FOREIGN PATENT DOCUMENTS

| DE | 4408011 C1 | 11/1995 |
| JP | H06263643 A | 9/1994 |

(Continued)

OTHER PUBLICATIONS

Alam, M., et al. "Design, synthesis and evaluation of alkylphosphocholine-gefitinib conjugates as multitarget anticancer agents." Archives of pharmacal research 41 (2018): 35-45.

(Continued)

*Primary Examiner* — Jeffrey S Lundgren
*Assistant Examiner* — Anthony Joseph Seitz
(74) *Attorney, Agent, or Firm* — Michael Best & Friedrich LLP

(57) ABSTRACT

Disclosed herein are phospholipid ether (PLE) molecules. Further provided are phospholipid-flavagline conjugates. The phospholipid-flavagline conjugate may include a PLE conjugated to a flavagline via a linker. Further provided herein are methods of treating cancer in a subject and methods of targeting a drug to a tumor or cancer cell in a subject.

12 Claims, 12 Drawing Sheets

(56) References Cited

U.S. PATENT DOCUMENTS

| | | | |
|---|---|---|---|
| 5,411,947 A | 5/1995 | Hostetler et al. | |
| 5,580,859 A | 12/1996 | Felgner et al. | |
| 5,679,647 A | 10/1997 | Carson et al. | |
| 7,632,644 B2 | 12/2009 | Weichert et al. | |
| 7,700,075 B2 | 4/2010 | Weichert et al. | |
| 7,811,548 B1 | 10/2010 | Pinchuk et al. | |
| 7,893,286 B2 | 2/2011 | Pinchuk et al. | |
| 8,022,235 B2 * | 9/2011 | Pinchuk | C07F 9/106 554/77 |
| 8,486,924 B2 | 7/2013 | Ansell et al. | |
| 8,535,641 B2 | 9/2013 | Weichert et al. | |
| 8,540,968 B2 | 9/2013 | Weichert et al. | |
| 8,871,181 B2 | 10/2014 | Pinchuk et al. | |
| 8,877,159 B2 | 11/2014 | Weichert et al. | |
| 8,877,160 B2 | 11/2014 | Weichert et al. | |
| 9,345,718 B1 | 5/2016 | Weichert | |
| 9,480,754 B2 | 11/2016 | Weichert | |
| 9,925,269 B2 | 3/2018 | Weichert et al. | |
| 10,577,378 B2 | 3/2020 | Ernst et al. | |
| 2002/0197306 A1 | 12/2002 | McDonald et al. | |
| 2007/0020178 A1 | 1/2007 | Weichert et al. | |
| 2007/0167408 A1 | 7/2007 | Perrissoud et al. | |
| 2009/0018357 A1 | 1/2009 | Pinchuk et al. | |
| 2010/0120727 A1 | 5/2010 | Xu | |
| 2010/0286510 A1 | 11/2010 | Pinchuk et al. | |
| 2011/0064661 A1 | 3/2011 | Pinchuk et al. | |
| 2012/0156133 A1 | 6/2012 | Pinchuk et al. | |
| 2013/0343991 A1 | 12/2013 | Weichert et al. | |
| 2014/0255432 A1 | 9/2014 | Baiocchi et al. | |
| 2015/0030538 A1 | 1/2015 | Weichert et al. | |
| 2015/0044142 A1 | 2/2015 | Pinchuk et al. | |
| 2015/0093330 A1 | 4/2015 | Weichert et al. | |
| 2016/0228564 A1 | 8/2016 | Weichert et al. | |
| 2017/0348422 A1 | 12/2017 | Pillow et al. | |
| 2017/0356914 A1 | 12/2017 | Weichert et al. | |
| 2018/0086729 A1 | 3/2018 | Marion et al. | |
| 2023/0066517 A1 * | 3/2023 | Longcor | C07F 9/572 |
| 2024/0325545 A1 * | 10/2024 | Longcor | C07F 9/65517 |

FOREIGN PATENT DOCUMENTS

| | | |
|---|---|---|
| JP | 2004043513 A | 2/2004 |
| JP | 2008545614 A | 12/2008 |
| JP | 2011504937 A | 2/2011 |
| JP | 2013504590 A | 2/2013 |
| WO | 1998024480 A1 | 6/1998 |
| WO | 2007013894 A2 | 2/2007 |
| WO | 2010132428 A1 | 11/2010 |
| WO | 2010144788 A2 | 12/2010 |
| WO | 2011031919 A2 | 3/2011 |
| WO | 2014106826 A2 | 7/2014 |
| WO | 2016036794 A1 | 3/2016 |
| WO | 2017201528 A1 | 11/2017 |
| WO | 2018205008 A1 | 11/2018 |
| WO | 2019065774 A1 | 4/2019 |
| WO | 2019157138 A1 | 8/2019 |
| WO | 2019203191 A1 | 10/2019 |
| WO | 2021072300 A1 | 4/2021 |

OTHER PUBLICATIONS

Masuda, S. et al. A trimethyllysine-containing trityl tag for solubilizing hydrophobic peptides. Org. Biomol. Chem., 2019, 17, 10228-10236.

Chinese Patent Office Notification of the First Office Action for Application No. 202080074561.3, dated Aug. 17, 2023, 17 pages with translation.

European Patent Office Extended Search Report for Application No. 20862948.5 dated Sep. 13, 2023 (9 pages).

Turkish Patent Office Action for Application No. 2020/16160, dated Aug. 3, 2023 (5 pages with translation).

Arpicco et al., "Preparation and characterization of novel poly(ethylene glycol) paclitaxel derivatives", Int J Pharm, Oct. 1, 2013, vol. 454, No. 2, pp. 653-659 (Epub May 20, 2013).

Bao et al., "Stem cell-like glioma cells promote tumor angiogenesis through vascular endothelial growth factor", Cancer Res, Aug. 15, 2006, vol. 66, No. 16, pp. 7843-7848.

Bellina et al., "Novel imidazole-based combretastatin A-4 analogues: Evaluation of their in vitro antitumor activity and molecular modeling study of their binding to the colchicine site of tubulin", Bioorganic & Medicinal Chemistry Letters, vol. 16, No. 22, 2006, pp. 5757-5762.

Blitterswijk et al., "Anticancer mechanisms and clinical application of alkylphospholipids", Biochimica et Biophysica Acta, vol. 1831, 2013, pp. 663-674.

Brown et al., "Lipid Raft Localization of ErbB2 in Vestibular Schwannoma and Schwann Cells," Otology & Neurology, 2007, vol. 29, pp. 79-85.

Buchwald, et al., "Long-term, continuous intravenous heparin administration by an implantable infusion pump in ambulatory patients with recurrent venous thrombosis", Surgery, Oct. 1980, vol. 88, No. 4, pp. 507-516.

Cohen et al., "Intracranial C6 glioma model in adult Wistar-Furth rats", J Neurooncol, Feb. 1990, vol. 8, No. 1, pp. 95-96.

de Mendoza et al., "Lipid Nanomedicines of Anticancer drug Therapy," Journal of Biomedical Nanotechnology, 2009, 5: 323-343.

Donnelley et al., "DNA Vaccines", Annu. Rev. Immunol., vol. 15, 1997, pp. 617-648.

Fleshner et al., "Prostate Cancer Prevention", American Cancer Society, 2007, pp. 1889-1899.

Goldmacher et al., "Antibody-drug conjugates: using monoclonal antibodies for delivery of cytotoxic payloads to cancer cells", Ther Deliv, Mar. 2011, 2(3), 397-416.

Guo et al., "Lipid metabolism emerges as a promising target for malignant glioma therapy," CNS Oncol., 2013, 2(3):289-299.

Heagerty et al., "Time-Dependent ROC Curves for Censored Survival Data and a Diagnostic Marker", Biometrics, vol. 56, 2000, pp. 337-344.

International Preliminary Report on Patentability for Application No. PCT/US2019/26853 dated Oct. 13, 2020 (6 pages).

International Search Report and Written Opinion for Application No. PCT/US19/26853 dated Aug. 16, 2019 (14 pages).

Kilkus et al., "Ceramide in Rafts (Detergent-Insoluble Fraction) Medicates Cell Death in Neurotumor Cell Lines," Journal of Neuroscience Research, 2003, 72:65-75.

Kumar et al., "PLK-1 Targeted Inhibitors and Their Potential against Tumorigenesis", Biomed Rest Int., 2015, 705-745.

Langer, "New methods of drug delivery", Science, Sep. 28, 1990, vol. 249, No. 4976, pp. 1527-1533.

Lerner et al., "The synthesis of beta.-keto lactones via cyclization beta-keto ester dianions or the cyclization of Meldrum's acid derivatives", Can J Chem, 1992, vol. 70, No. 5, pp. 1427-1445.

Li et al., "Elevated Levels of Cholesterol-Rich Lipid Rafts in Cancer Cells Are Correlated with Apoptosis Sensitivity Induced by Cholesterol-Depleting Agents," American Journal of Pathology, 2006, vol. 168, No. 4, pp. 1107-1118.

Mahato et al., "Prodrugs for improving tumor targetability and efficiency," Advanced Drug Delivery Reviews, 2011, vol. 63, pp. 659-670.

Mollinedo et al., "Lipid rafts as signaling hubs in cancer cell survival/death and invasion: implications in tumor progression and therapy," Journal of Lipid Research, May 2020, vol. 61, No. 5, pp. 611-635.

Murai, "The Role of Lipid Rafts in Cancer Cell Adhesion and Migration," International Journal of Cell Biology, 2012, Article ID 763283, 6 pages.

National Center for Biotechnology Information. PubChem Substance Record for SID 252827261, SID 252827261, Source: Thomson Pharma. <https://pubchem.ncbi.nlm.nih.gov/substance/252827261> Available Oct. 2015.

Pedersen et al., "Synthesis and Biophysical Characterization of Chlorambucil Anticancer Ether Lipid Prodrugs", J. Med. Chem., vol. 52, 2009, pp. 3408-3415.

(56) References Cited

OTHER PUBLICATIONS

Peters et al., "Antibody-drug conjugates as novel anti-cancer chemotherapeutics", Bioscience Reports, 2015, vol. 35, No. 4, e00225, 20 pages.
Peters et al., "Probing cell-division phenotype space and Polo-like kinase function using small molecules", Nat Chem Biol, vol. 2, No. 11, 2006, pp. 618-626.
Pinchuk et al., "Synthesis and Structure-Activity Relationship Effects on the Tumor Avidity of Radioiodinated Phospholipid Ether Analogues", J. Med. Chem., vol. 49, pp. 2155-2165.
Poste et al., "Lipid Vesicles as Carriers for Introducing Biologically Active Materials into Cells", Methods in Cell Biology (Edited by Prescott, vol. XIV) Chapter 4, 1976, pp. 34-68.
Prichard et al., "The prevention of breast cancer," British Journal of Surgery, 2003, 90, pp. 772-783.
PubChem SID 104583910, Feb. 22, 2011 (7 pages).
Rampy et al., "Synthesis and Biological Evaluation of Radioiodinated Phospholipid Ether Analogs," Nuclear Medicine and Biology, 1995, 22, pp. 505-512.
Rodriguez-Antona, "Pharmacogenomics of paclitaxel", Pharmacogenomics, vol. 11, No. 6, 2010, pp. 621-623.
Sathornsumetee et al., "Phase II trial of bevacizumab and erlotinib in patients with recurrent malignant glioma", Neuro Oncol, Dec. 2010, 12(12), pp. 1300-1310.
Saudek et al., "A preliminary trial of the programmable implantable medication system for insulin delivery", N Engl J Med, Aug. 31, 1989, 321(9), pp. 574-579.
Sefton, "Implantable pumps", Crit Rev Biomed Eng, 1987, 14(3), pp. 201-240.
Snyder et al., "Alkyl and alk-1-enyl ethers of glycerol in lipids from normal and neoplastic human tissues", Cancer Res, Jan. 1969, 29(1), pp. 251-257.
Snyder et al., "The occurrence and metabolism of alkyl and alk-1-enyl ethers of glycerol in transplantable rat and mouse tumors", Cancer Res, May 1968, 28(5), pp. 972-978.
Subczynski et al., "Dynamics of raft molecules in the cell and artificial membranes: approaches by pulse EPR spin labeling and single molecule optical microscopy," Biochimica et Biophysica Acta, 2003, 1610:231-243.
Tranoy-Opalinski et al., "beta-Glucuronidase-responsive prodrugs for selective cancer chemotherapy: an update", Eur J Med Chem, 2014, vol. 74, pp. 302-313.
Tranoy-Opalinski et al., "Design of self-immolative linkers for tumour-activated prodrug therapy", Anticancer Agents Med Chem, Aug. 2008, vol. 8, No. 6, pp. 618-637.
Wang et al., "Doxorubicin conjugated phospholipid preodrugs as smart nanomedicine plataforms for cancer therapy," Journal of Materials Chemistry, 2015, 3, pp. 3297-3305.
Wang, "Anti-Paclitaxel Resistance Effect of Somatostatin Receptors Mediated Targeted Therapy on Non-Small Cell Lung Cancer Cells and its Possible Mechanisms," Doctoral Dissertation of Shandong University, Jun. 29, 2010, pp. 32-38 (Statement of relevance included).
Weichert et al., Alkylphosphocholine analogs for broad-spectrum cancer imaging and therapy, Sci Transl Med, Jun. 11, 2014, vol. 6, No. 240, pp. 240ra75.
Weichert et al., Radioiodination via isotope exchange in pivalic acid, Int J Appl Rad Isotopes, 1986, vol. 37, No. 8, pp. 907-913.
Eurasian Patent Office Action for Application No. 202092369 dated Aug. 2, 2022 (7 pages with translation).
Eurasian Patent Office Action for Application No. 202290818 dated Oct. 9, 2023 (8 pages with English translation).
United Arab Emirates Office Action for Application No. P6001410/2020, dated Dec. 20, 2023 (9 pages).
Vietnamese Patent Office Action for Application No. 1-2020-06001, dated Dec. 27, 2023 (4 pages with translation).
European Patent Office Extended Search Report for Application No. 20875069.5 dated Nov. 16, 2023 (7 pages).
Eurasian Patent Office action for Application No. 202092369 dated Nov. 30, 2021 (4 pages with English translation).
European Patent Office Extended Search Report for Application No. 19784548.0 dated Mar. 14, 2022 (18 pages).
North et al., "Autotaxin structure-activity relationships revealed through lysophosphatidylcholine analogs", Bioorganic & Medicinal Chemistry, 2009, vol. 17, No. 9, pp. 3433-3442.
International Preliminary Report on Patentability for Application No. PCT/US2020050459 dated Mar. 24, 2022 (6 pages).
International Preliminary Report on Patentability for Application No. PCT/US20/055121 dated Apr. 12, 2022 (5 pages).
Australian Patent Office Action for Application No. 2019251483 dated Apr. 19, 2021 (3 pages).
Japanese Patent Office Action for application 2020-555450, dated Mar. 14, 2023, (8 pages with translation).
Mexican Patent Office Action for application MX/A/2020/010741, dated Mar. 3, 2023 (8 pages with machine translation).
Israeli Patent Office Action for application 277875, dated Mar. 12, 2023 (5 pages).
Israeli Patent Office Action for application 304245, dated Jan. 7, 2024 (5 pages).
Korean Patent Office Action for application 10-2020-7030504, dated Feb. 12, 2024 (15 pages with translation).
Canadian Patent Office—Office Action for Application No. 3,095,515 dated Mar. 27, 2023 (7 pages).
Basmadjian, C., et al. "Flavaglines: potent anticancer drugs that target prohibitins and the helicase eIF4A." Future medicinal chemistry 5.18 (2013): 2185-2197.
U.S. National Library of Medicine, "Sarcoma MeSH Descriptor Data", <https://meshb.nlm.nih.gov/record/ui?ui=D012509>, accessed May 29, 2021 (1 page).
Dickey, "Medscape Fibrosarcoma—Overview", <https://emedicine.medscape.com/article/1257520-overview>, accessed May 29, 2021 (1 page).
Indian Intellectual Property First Examination Report for application 202017042352, dated Apr. 29, 2022 (7 pages).
Eurasian Patent Office Action for Application No. 202290942 dated Nov. 3, 2022 (12 pages with translation).
Chinese Patent Office Action for Application No. 201980036064.8 dated Jan. 5, 2023 (19 pages with translation).
Eurasian Patent Second Office Action for Application No. 202290942 dated Jun. 1, 2023 (13 pages, English translation included).
European Patent Office Partial Supplementary Search Report for Application No. 19784548.0 dated Dec. 8, 2021 (20 pages).
Thuaud et al., "Synthetic Analogue of Rocaglaol Displays a Potent and Selective Cytotoxicity in Cancer Cells: Involvement of Apoptosis Inducing Factor and Caspase-12", Journal of Medicinal Chemistry, 2009, vol. 52, No. 16, pp. 5176-5187.
Canadian Patent Office First Office Action for Application No. 2,968,145 dated Nov. 15, 2021 (6 pages).
Singaporean Patent Office Written Opinion for Application No. 11202203580P, dated Apr. 1, 2024 (8 pages).
Singaporean Patent Office Written Opinion for Application No. 11202202467P, dated Apr. 1, 2024 (9 pages).
Chinese Patent Office Action Notification of the First Office Action for Application No. 202080081971.7, dated Apr. 22, 2024 (22 pages with translation).
New Zealand Patent Office Patent Examination Report 1 for Application No. 768472, dated May 29, 2024 (5 pages).
Zihan, G. et al., Overview of the development of tumor molecular targeted therapeutic drugs. Shanghai Medicine, 2018, Issue 05, 9-13 (English abstract, 3 pages).
Wenqi, L. et al., Study on the dynamic activity of tegafur derivatives with lecithin analogs as carriers, Journal of Hunan University (Natural Science Edition), vol. 31, No. 02, 10-12, 2004 (English Abstract, 4 pages).
Grudzinski, J., et al. "CLR 125 Auger electrons for the targeted radiotherapy of triple-negative breast cancer." Cancer Biotherapy & Radiopharmaceuticals 33.3 (2018): 87-95.
Mexican Patent Office Action for application MX/A/2022/003044, dated Feb. 6, 2025 (10 pages with machine translation).
Japanese Patent Office Action for application 2020-516159, dated Aug. 13, 2024, (7 pages with translation).
Indian Intellectual Property Examination Report for application 202217015147, dated Sep. 10, 2024 (7 pages).

(56) References Cited

OTHER PUBLICATIONS

Japanese Patent Office Decision of Final Rejection for application 2020-516159, dated Mar. 4, 2025, (5 pages with translation).
Wikipedia. Flavaglines. Version dated Feb. 4, 2012. Available online at https://web.archive.org/ web/20120204162050/https://en.wikipedia.org/wiki/Flavagline (1 page).
Eurasian Patent Office. Office Action for Application No. 202290818, dated May 5, 2025 (6 pages with translation).
Chinese Patent Office. Office Action for Application No. 202310088164.3, dated May 16, 2025 (18 pages with machine translation).
D'Abronzo et al., "eIF4E Phosphorylation in Prostate Cancer", Neoplasia, vol. 20, No. 6, 2018, pp. 563-573.
Mabe et al., "Asymmetric radical addition of TEMPO to titanium enolates", Org Lett, Jan. 17, 2014, 16(2), 516-9, Epub Dec. 31, 2013.
Saudi Authority for Intellectual Property First Examination Report for application 520420298, dated May 17, 2022 (5 pages with Statement of Relevance).
Chinese Patent Office Action for Application No. 201580073699.7 dated May 5, 2022 (10 pages with Statement of Relevance).
Ignatov, M.E. et al., "Conjugate as Subject Matter", Patent Attorney (Russ.), 2019, No. 4, pp. 35-46, http://www.eapo.org/pdf/home/publications/2019ignatov_lubyako_serova.pdf.
Mexican Patent Office. Office Action for Application No. MX/a/2022/003044, dated Jul. 10, 2025, 12 pages with machine translation.
Australian Patent Office. Office Action for Application No. 2020346898 dated Aug. 12, 2025 (4 pages).
Canadian Patent Office. Office Action for Application No. 3,150,991, dated Aug. 18, 2025 (5 pages).

\* cited by examiner

FIG. 11

PHOSPHOLIPID-FLAVAGLINE CONJUGATES AND METHODS OF USING THE SAME FOR TARGETED CANCER THERAPY

CROSS-REFERENCE TO RELATED APPLICATIONS

This application is a U.S. national stage filing under 35 U.S.C. 371 of International Application No. PCT/US2019/026853, filed Apr. 10, 2019, which application claims priority to U.S. Provisional Patent Application No. 62/655,659, filed Apr. 10, 2018, each of which are incorporated herein by reference in their entireties.

FIELD

This disclosure relates to phospholipid-flavagline conjugates and targeted cancer therapies.

INTRODUCTION

The majority of anticancer drugs in clinical use have their utility limited by their toxicity to all proliferating cells and/or the inability to exert their effect on all of the tumor cells. Novel agents continue to be developed with unique mechanisms of action meant to provide increased targeting, however, many of these compounds still lack absolute tumor selectivity and continue to be limited in their therapeutic utilization due to off-target effects. Antibody drug conjugates (ADCs) have been designed to bind to specific epitopes on the surface of tumor cells and have offered an alternative method to target tumor cells in an effort to reduce associated toxicities. Although highly selective, very few antibody drug conjugates are therapeutically useful since they only achieve modest cellular uptake and limited cell killing activity. More effective tumor targeting platforms are needed.

SUMMARY

In an aspect, the disclosure relates to a phospholipid ether (PLE) according to Formula I, or a salt thereof:

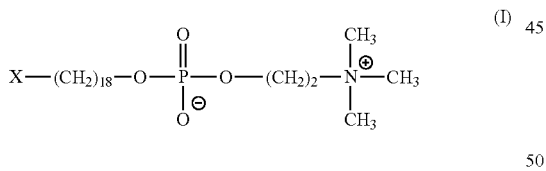

wherein X is hydrogen, methyl, or phenyl substituted with carboxyl. In some embodiments, the PLE is selected from the following:

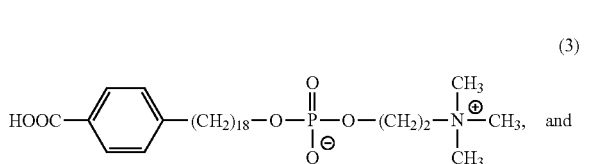

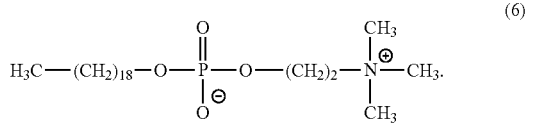

In some embodiments, the PLE further includes a detectable moiety attached thereto.

In a further aspect, the disclosure relates to a composition comprising the PLE as detailed herein and a carrier.

Another aspect of the disclosure provides a compound selected from the following:

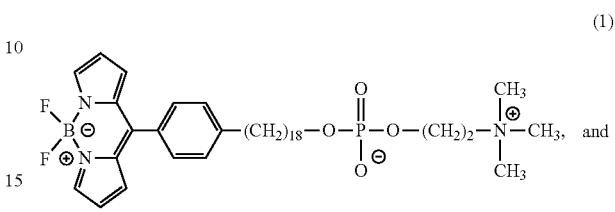

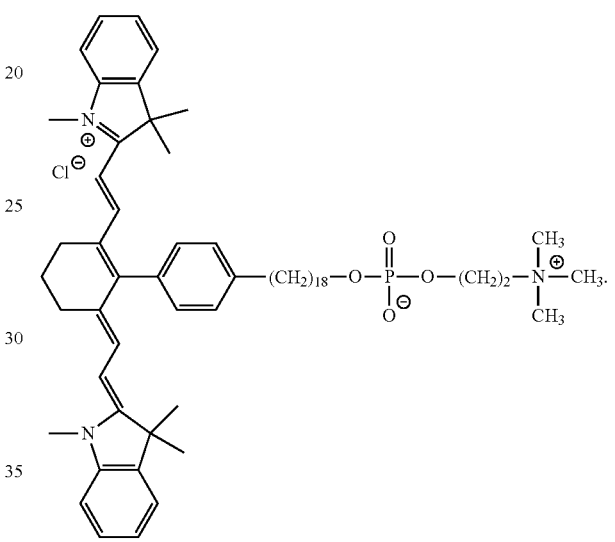

Another aspect of the disclosure provides a composition comprising at least one of these compounds and a carrier.

Another aspect of the disclosure provides a conjugate according to Formula II, or a salt thereof:

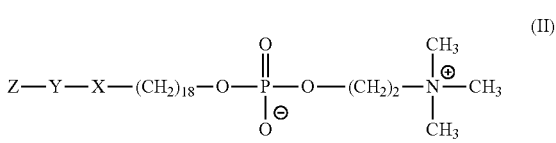

wherein X is,

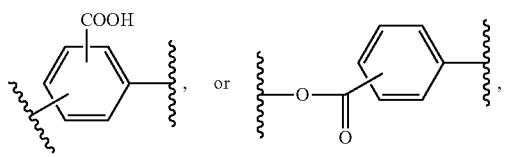

or methylene, or bond; Y is a linker comprising a disulfide; and Z is a flavagline anti-cancer drug. In some embodiments, the flavagline anti-cancer drug comprises FLV-1, FLV-3, a derivative or analog thereof, or a combination thereof. In some embodiments, the linker comprises the following:

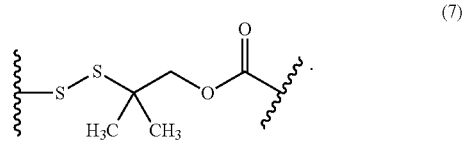 [SMILES: *SSC(C)(C)COC(*)=O]

(7)

In some embodiments, the conjugate is selected from the following:

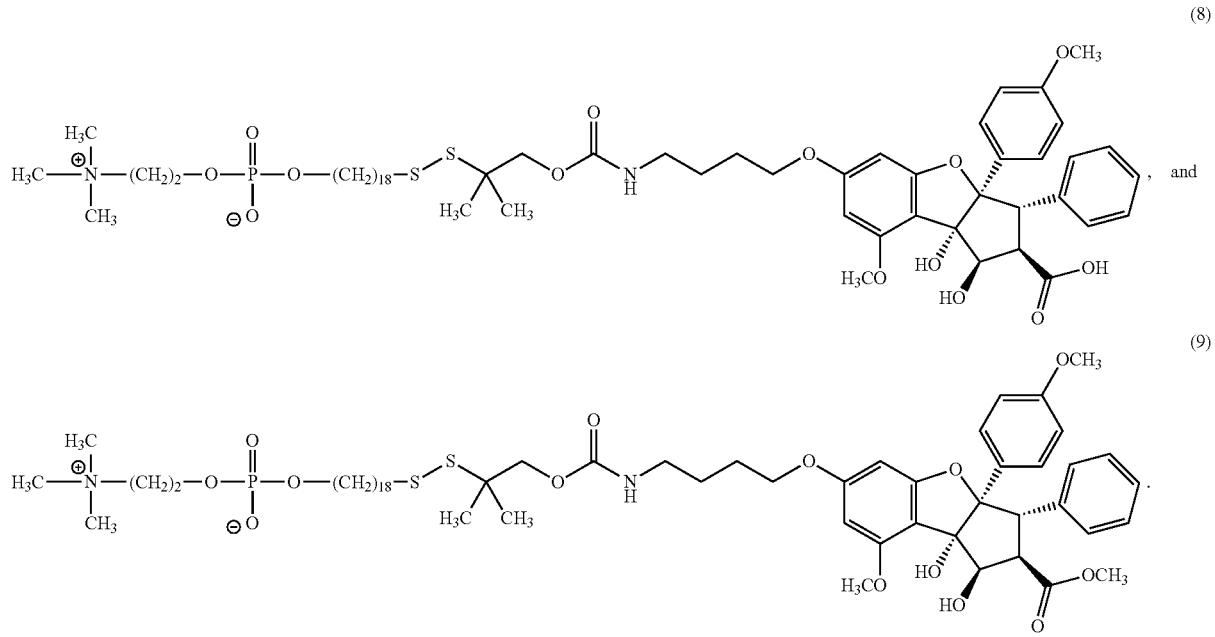

Another aspect of the disclosure provides a composition comprising a conjugate as detailed herein and a pharmaceutically acceptable carrier.

Another aspect of the disclosure provides a method of treating cancer in a subject, the method comprising administering to the subject a conjugate as detailed herein.

Another aspect of the disclosure provides a method of targeting a drug to a tumor or cancer cell in a subject, the method comprising administering to the subject a conjugate as detailed herein.

In some embodiments, the flavagline anti-cancer drug localizes or travels to the cytoplasm or organelle of the tumor or cancer cell. In some embodiments, the conjugate or flavagline anti-cancer drug is selective for cancer cells in the subject. In some embodiments, the conjugate or flavagline anti-cancer drug is incorporated into at least about 2-fold more tumor or cancer cells than healthy cells. In some embodiments, the cancer is selected from melanoma, brain cancer, lung cancer, adrenal cancer, liver cancer, renal or kidney cancer, pancreatic cancer, esophageal cancer, gastric cancer, stomach cancer, colon cancer, colorectal cancer, anal cancer, prostate cancer, ovarian cancer, breast cancer, cervical cancer, lymphoma, leukemia, myeloma, hematologic cancer, hepatocarcinoma, retinoblastoma, glioma, sarcoma, blastoma, squamous cell carcinoma, and adenocarcinoma. In some embodiments, the subject is human.

The disclosure provides for other aspects and embodiments that will be apparent in light of the following detailed description and accompanying figures.

BRIEF DESCRIPTION OF THE DRAWINGS

FIG. 11 is a graph of concentration versus time for FLV3 detected in the cytosol (normalized to the cytosolic volume) in A375 (human melanoma) and A549 (human lung adenocarcinoma) cell lines.

DETAILED DESCRIPTION

Figure 1A:
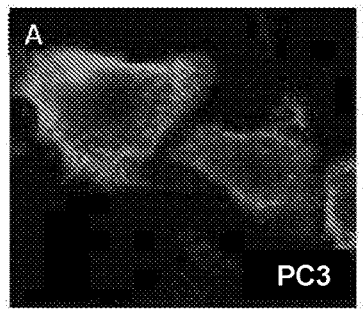
FIG. 1A, FIG. 1B, FIG. 1C, FIG. 1D, FIG. 1E are images of tumor cells with lipid rafts labeled. Tumor cells had a greater concentration of lipid rafts compared to normal cells.
Figure 1B:
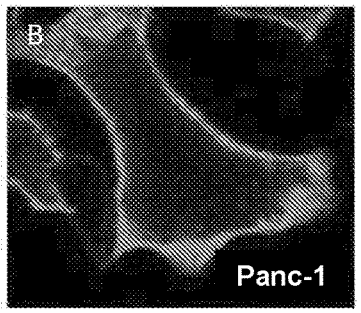
Figure 1C:
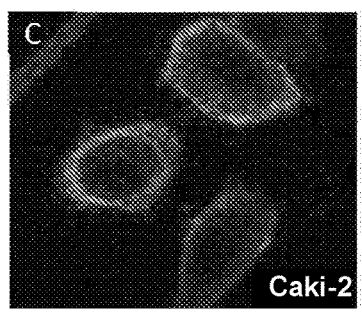
Figure 1D:
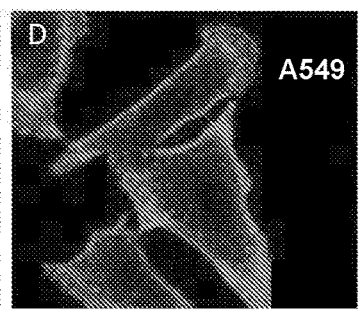

Described herein are phospholipid compounds and phospholipid-flavagline conjugates. Based on numerous animal and human tumors containing higher concentrations of naturally occurring ether lipids than normal tissues, phospholipid ether (PLE) molecules were developed. The PLE molecules detailed herein may be used as a tumor targeting platform to selectively deliver drugs to tumors and cancer cells.

As detailed herein, the tissue distribution of the PLE molecules was examined in over 100 different tumor cells, including fresh human tumor samples. The PLE molecules demonstrated increased uptake in tumor tissue versus normal tissue. The PLE molecules may be conjugated to flavagline molecules and derivatives thereof via linkers to form phospholipid-flavagline conjugates.

1. DEFINITIONS

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of," the embodiments or elements presented herein, whether explicitly set forth or not.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

The term "about" as used herein as applied to one or more values of interest, refers to a value that is similar to a stated reference value. In certain aspects, the term "about" refers to a range of values that fall within 20%, 19%, 18%, 17%, 16%, 15%, 14%, 13%, 12%, 11%, 10%, 9%, 8%, 7%, 6%, 5%, 4%, 3%, 2%, 1%, or less in either direction (greater than or less than) of the stated reference value unless otherwise stated or otherwise evident from the context (except where such number would exceed 100% of a possible value).

Definitions of specific functional groups and chemical terms are described in more detail below. For purposes of this disclosure, the chemical elements are identified in accordance with the Periodic Table of the Elements, CAS version, Handbook of Chemistry and Physics, 75$^{th}$ Ed., inside cover, and specific functional groups are generally defined as described therein. Additionally, general principles of organic chemistry, as well as specific functional moieties and reactivity, are described in *Organic Chemistry*, Thomas Sorrell, University Science Books, Sausalito, 1999; Smith and March *March's Advanced Organic Chemistry*, 7$^{th}$ Edition, John Wiley & Sons, Inc., New York, 2013; Larock, *Comprehensive Organic Transformations*, VCH Publishers, Inc., New York, 1989; Carruthers, *Some Modern Methods of Organic Synthesis*, 3$^{rd}$ Edition, Cambridge University Press, Cambridge, 1987; the entire contents of each of which are incorporated herein by reference.

The term "alkoxy" or "alkoxyl" as used herein, refers to an alkyl group, as defined herein, appended to the parent molecular moiety through an oxygen atom. Representative examples of alkoxy include, but are not limited to, methoxy, ethoxy, propoxy, 2-propoxy, butoxy and tert-butoxy.

The term "alkyl" as used herein, means a straight or branched, saturated hydrocarbon chain containing from 1 to 20 carbon atoms. The term "lower alkyl" or "$C_{1-6}$ alkyl" means a straight or branched chain hydrocarbon containing from 1 to 6 carbon atoms. The term "$C_{1-4}$ alkyl" means a straight or branched chain hydrocarbon containing from 1 to 4 carbon atoms. The term "$C_{1-3}$ alkyl" means a straight or branched chain hydrocarbon containing from 1 to 3 carbon atoms. Representative examples of alkyl include, but are not limited to, methyl, ethyl, n-propyl, iso-propyl, n-butyl, sec-butyl, iso-butyl, tert-butyl, n-pentyl, isopentyl, neopentyl, n-hexyl, 3-methylhexyl, 2,2-dimethylpentyl, 2,3-dimethylpentyl, n-heptyl, n-octyl, n-nonyl, and n-decyl.

The term "alkenyl" as used herein, means an unsaturated hydrocarbon chain containing from 2 to 20 carbon atoms and at least one carbon-carbon double bond.

The term "alkynyl" as used herein, means an unsaturated hydrocarbon chain containing from 2 to 20 carbon atoms and at least one carbon-carbon triple bond.

The term "alkoxyalkyl" as used herein, refers to an alkoxy group, as defined herein, appended to the parent molecular moiety through an alkylene group, as defined herein.

The term "arylalkyl" as used herein, refers to an aryl group, as defined herein, appended to the parent molecular moiety through an alkylene group, as defined herein.

The term "alkylamino," as used herein, means at least one alkyl group, as defined herein, is appended to the parent molecular moiety through an amino group, as defined herein.

The term "alkylene," as used herein, refers to a divalent group derived from a straight or branched chain hydrocarbon of 1 to 10 carbon atoms, for example, of 2 to 5 carbon atoms. Representative examples of alkylene include, but are not limited to, —$CH_2CH_2$—, —$CH_2CH_2CH_2$—, —$CH_2CH_2CH_2CH_2$—, and —$CH_2CH_2CH_2CH_2CH_2$—.

The term "amide," as used herein, means —C(O)NR— or —NRC(O)—, wherein R may be hydrogen, alkyl, cycloalkyl, aryl, heteroaryl, heterocycle, alkenyl, or heteroalkyl.

The term "aminoalkyl," as used herein, means at least one amino group, as defined herein, is appended to the parent molecular moiety through an alkylene group, as defined herein.

The term "amino" as used herein, means —$NR_xR_y$, wherein $R_x$ and $R_y$ may be hydrogen, alkyl, cycloalkyl, aryl, heteroaryl, heterocycle, alkenyl, or heteroalkyl. In the case of an aminoalkyl group or any other moiety where amino appends together two other moieties, amino may be —$NR_x$—, wherein $R_x$ may be hydrogen, alkyl, cycloalkyl, aryl, heteroaryl, heterocycle, alkenyl, or heteroalkyl.

The term "aryl" as used herein, refers to an aromatic group such as a phenyl group, or a bicyclic fused ring system. Bicyclic fused ring systems are exemplified by a phenyl group appended to the parent molecular moiety and fused to a cycloalkyl group, as defined herein, a phenyl group, a heteroaryl group, as defined herein, or a heterocycle, as defined herein. Representative examples of aryl include, but are not limited to, indolyl, naphthyl, phenyl, quinolinyl, and tetrahydroquinolinyl. "Arylalkyl" refers to an alkyl as defined herein substituted with an aryl radical.

"Arylene" refers to an aryl as defined herein having two monovalent radical centers derived by the removal of two hydrogen atoms from two different carbon atoms of a parent aryl. Typical arylene radicals include, but are not limited to, phenylene and naphthylene. "Arylalkylene" refers to an arylalkyl as defined herein having two monovalent radical centers derived by the removal of one hydrogen atom from the aryl radical and the other hydrogen removed from the alkyl radical of the group.

The term "carboxyl" as used herein, means a carboxylic acid, or —COOH.

The term "cycloalkyl" means a monovalent saturated hydrocarbon ring or a bicyclic group. Cycloalkyl groups have zero heteroatoms and zero double bonds. Cycloalkyl groups are monocyclic, or are fused, spiro, or bridged bicyclic ring systems. Monocyclic cycloalkyl groups contain 3 to 10 carbon atoms, preferably 4 to 7 carbon atoms, and more preferably 5 to 6 carbon atoms in the ring. Bicyclic cycloalkyl groups contain 8 to 12 carbon atoms, preferably 9 to 10 carbon atoms in the ring. Cycloalkyl groups may be substituted or unsubstituted. Cycloalkyl groups include, for example, cyclopropyl, cyclobutyl, cyclopentyl, cyclohexyl, and cycloheptyl.

The term "cycloalkenyl," as used herein, means a non-aromatic monocyclic or multicyclic ring system containing at least one carbon-carbon double bond and preferably having from 5-10 carbon atoms per ring. Exemplary monocyclic cycloalkenyl rings include cyclopentenyl, cyclohexenyl, and cycloheptenyl.

The term "cycloalkynyl," as used herein, means a monocyclic or multicyclic ring system containing at least one carbon-carbon triple bond and preferably having from 5-10 carbon atoms per ring or more than 10 carbon atoms per ring.

The term "haloalkyl" as used herein, means an alkyl group, as defined herein, in which one, two, three, four, five, six, seven or eight hydrogen atoms are replaced by a halogen. Representative examples of haloalkyl include, but are not limited to, 2-fluoroethyl, 2,2,2-trifluoroethyl, trifluoromethyl, difluoromethyl, pentafluoroethyl, and trifluoropropyl such as 3,3,3-trifluoropropyl.

The term "halogen" or "halo" as used herein, means Cl, Br, I, or F.

The term "heteroalkyl" as used herein, means an alkyl group, as defined herein, in which at least one of the carbons of the alkyl group is replaced with a heteroatom, such as oxygen, nitrogen, and sulfur. Representative examples of heteroalkyls include, but are not limited to, alkyl ethers, secondary and tertiary alkyl amines, amides, and alkyl sulfides.

The term "heteroaryl" as used herein, refers to an aromatic monocyclic ring or an aromatic bicyclic ring system containing at least one heteroatom independently selected from the group consisting of N, O, and S. The aromatic monocyclic rings are five or six membered rings containing at least one heteroatom independently selected from the group consisting of N, O, and S. The five membered aromatic monocyclic rings have two double bonds and the six membered six membered aromatic monocyclic rings have three double bonds. The bicyclic heteroaryl groups are exemplified by a monocyclic heteroaryl ring appended to the parent molecular moiety and fused to a monocyclic cycloalkyl group, as defined herein, a monocyclic aryl group, as defined herein, a monocyclic heteroaryl group, as defined herein, or a monocyclic heterocycle, as defined herein. Representative examples of heteroaryl include, but are not limited to, indolyl, pyridinyl (including pyridin-2-yl, pyridin-3-yl, pyridin-4-yl), pyrimidinyl, pyrazinyl, pyridazinyl, pyrazolyl, pyrrolyl, benzopyrazolyl, 1,2,3-triazolyl, 1,3,4-thiadiazolyl, 1,2,4-thiadiazolyl, 1,3,4-oxadiazolyl, 1,2,4-oxadiazolyl, imidazolyl, thiazolyl, isothiazolyl, thienyl, benzimidazolyl, benzothiazolyl, benzoxazolyl, benzoxadiazolyl, benzothienyl, benzofuranyl, isobenzofuranyl, furanyl, oxazolyl, isoxazolyl, purinyl, isoindolyl, quinoxalinyl, indazolyl, quinazolinyl, 1,2,4-triazinyl, 1,3,5-triazinyl, isoquinolinyl, quinolinyl, 6,7-dihydro-1,3-benzothiazolyl, imidazo[1,2-a]pyridinyl, naphthyridinyl, pyridoimidazolyl, thiazolo[5,4-b]pyridin-2-yl, thiazolo[5,4-d]pyrimidin-2-yl.

The term "heterocycle" or "heterocyclic" or "heterocyclyl" as used herein means a monocyclic heterocycle, a bicyclic heterocycle (heterobicyclic), or a tricyclic heterocycle. The monocyclic heterocycle is a three-, four-, five-, six-, seven-, or eight-membered ring containing at least one heteroatom independently selected from the group consisting of O, N, and S. The three- or four-membered ring contains zero or one double bond, and one heteroatom selected from the group consisting of O, N, and S. The five-membered ring contains zero or one double bond and one, two, or three heteroatoms selected from the group consisting of O, N, and S. The six-membered ring contains zero, one, or two double bonds and one, two, or three heteroatoms selected from the group consisting of O, N, and S. The seven- and eight-membered rings contains zero, one, two, or three double bonds and one, two, or three heteroatoms selected from the group consisting of O, N, and S. Representative examples of monocyclic heterocycles include, but are not limited to, azetidinyl, azepanyl, aziridinyl, diazepanyl, 1,3-dioxanyl, 1,3-dioxolanyl, 1,3-dithiolanyl, 1,3-dithianyl, imidazolinyl, imidazolidinyl, isothiazolinyl, isothiazolidinyl, isoxazolinyl, isoxazolidinyl, morpholinyl, oxadiazolinyl, oxadiazolidinyl, oxazolinyl, oxazolidinyl, oxetanyl, piperazinyl, piperidinyl, pyranyl, pyrazolinyl, pyrazolidinyl, pyrrolinyl, pyrrolidinyl, tetrahydrofuranyl, tetrahydropyranyl, tetrahydropyridinyl, tetrahydrothienyl, thiadiazinanyl, thiadiazolidinyl, 1,2-thiazinanyl, 1,3-thiazinanyl, thiazolinyl, thiazolidinyl, thiomorpholinyl, 1,1-dioxidothiomorpholinyl (thiomorpholine sulfone), thiopyranyl, and trithianyl. The bicyclic heterocycle is a monocyclic heterocycle fused to a phenyl group, or a monocyclic heterocycle fused to a monocyclic cycloalkyl, or a monocyclic heterocycle fused to a monocyclic cycloalkenyl, or a monocyclic heterocycle fused to a monocyclic heterocycle, or a bridged monocyclic heterocycle ring system in which two non-adjacent atoms of the ring are linked by an alkylene bridge of 1, 2, 3, or 4 carbon atoms, or an alkenylene bridge of two, three, or four carbon atoms. Representative examples of bicyclic heterocycles include, but are not limited to, benzopyranyl, benzothiopyranyl, chromanyl, 2,3-dihydrobenzofuranyl, 2,3-dihydrobenzothienyl, 2,3-dihydroisoquinoline, azabicyclo[2.2.1]heptyl (including 2-azabicyclo[2.2.1]hept-2-yl), 2,3-dihydro-1H-indolyl, isoindolinyl, octahydrocyclopenta[c]pyrrolyl, octahydropyrrolopyridinyl, and tetrahydroisoquinolinyl. Tricyclic heterocycles are exemplified by a bicyclic heterocycle fused to a phenyl group, or a bicyclic heterocycle fused to a monocyclic cycloalkyl, or a bicyclic heterocycle fused to a monocyclic cycloalkenyl, or a bicyclic heterocycle fused to a monocyclic heterocycle, or a bicyclic heterocycle in which two non-adjacent atoms of the bicyclic ring are linked by an alkylene bridge of 1, 2, 3, or 4 carbon atoms, or an alkenylene bridge of two, three, or four carbon atoms. Examples of tricyclic heterocycles include, but not limited to, octahydro-2,5-epoxypentalene, hexahydro-2H-2,5-methanocyclopenta[b]furan, hexahydro-1H-1,4-methanocyclopenta[c]furan, aza-adamantane (1-azatricyclo[3.3.1.1$^3$]decane), and oxa-adamantane (2-oxatricyclo[3.3.1.1$^{3,7}$]decane). The monocyclic, bicyclic, and tricyclic heterocycles are connected to the parent molecular moiety through any carbon atom or any nitrogen atom contained within the rings, and can be unsubstituted or substituted.

The term "heteroarylalkyl" as used herein, refers to a heteroaryl group, as defined herein, appended to the parent molecular moiety through an alkylene group, as defined herein.

The term "heterocyclylalkyl" as used herein, refers to a heterocycle group, as defined herein, appended to the parent molecular moiety through an alkylene group, as defined herein.

The term "hydroxyl" or "hydroxy" as used herein, means an —OH group.

The term "hydroxyalkyl" as used herein, means at least one —OH group, is appended to the parent molecular moiety through an alkylene group, as defined herein.

In some instances, the number of carbon atoms in a hydrocarbyl substituent (e.g., alkyl or cycloalkyl) is indicated by the prefix "$C_{x\text{-}y}$-", wherein x is the minimum and y is the maximum number of carbon atoms in the substituent. Thus, for example, "$C_{1\text{-}3}$ alkyl" refers to an alkyl substituent containing from 1 to 3 carbon atoms.

The term "substituted" refers to a group that may be further substituted with one or more non-hydrogen substituent groups. Substituent groups include, but are not limited to, halogen, =O (oxo), =S (thioxo), cyano, nitro, fluoroalkyl, alkoxyfluoroalkyl, fluoroalkoxy, alkyl, alkenyl, alkynyl, haloalkyl, haloalkoxy, heteroalkyl, cycloalkyl, cycloalkenyl, aryl, heteroaryl, heterocycle, cycloalkylalkyl, heteroarylalkyl, arylalkyl, hydroxy, hydroxyalkyl, alkoxy, alkoxyalkyl, alkylene, aryloxy, phenoxy, benzyloxy, amino, alkylamino, acylamino, aminoalkyl, arylamino, sulfonylamino, sulfinylamino, sulfonyl, alkylsulfonyl, arylsulfonyl, aminosulfonyl, sulfinyl, —COOH, ketone, amide, carbamate, and acyl.

The term " ≡≡≡≡ " designates a single bond ( — ) or a double bond ( = ) or a triple bond ( ≡ ).

For compounds described herein, groups and substituents thereof may be selected in accordance with permitted valence of the atoms and the substituents, such that the selections and substitutions result in a stable compound, e.g., which does not spontaneously undergo transformation such as by rearrangement, cyclization, elimination, etc.

The term "administration" or "administering," as used herein, refers to providing, contacting, and/or delivery of a compound or conjugate by any appropriate route to achieve the desired effect. These compounds or conjugates may be administered to a subject in numerous ways including, but not limited to, orally, ocularly, nasally, intravenously, topically, as aerosols, suppository, etc. and may be used in combination.

As used herein, "cancer" may include any cell or tissue derived from a tumor, neoplasm, cancer, precancer, cell line, malignancy, or any other source of cells that have the potential to expand and grow to an unlimited degree. Cancer cells may be derived from naturally occurring sources or may be artificially created. Cancer cells may also be capable of invasion into other tissues and metastasis. Cancer cells further encompass any malignant cells that have invaded other tissues and/or metastasized. One or more cancer cells in the context of an organism may also be called a cancer, tumor, neoplasm, growth, malignancy, or any other term used in the art to describe cells in a cancerous state. Cancer may include, for example, melanoma, brain cancer, lung cancer, adrenal cancer, liver cancer, renal or kidney cancer, pancreatic cancer, esophageal cancer, gastric cancer, stomach cancer, colon cancer, colorectal cancer, anal cancer, prostate cancer, ovarian cancer, breast cancer, cervical cancer, lymphoma, leukemia, myeloma, hematologic cancer, hepatocarcinoma, retinoblastoma, glioma, sarcoma, blastoma, squamous cell carcinoma, and adenocarcinoma.

The terms "control," "reference level," and "reference" are used herein interchangeably. The reference level may be a predetermined value or range, which is employed as a benchmark against which to assess the measured result. "Control group" as used herein refers to a group of control subjects. The predetermined level may be a cutoff value from a control group. The predetermined level may be an average from a control group. Cutoff values (or predetermined cutoff values) may be determined by Adaptive Index Model (AIM) methodology. Cutoff values (or predetermined cutoff values) may be determined by a receiver operating curve (ROC) analysis from biological samples of the patient group. ROC analysis, as generally known in the biological arts, is a determination of the ability of a test to discriminate one condition from another. A description of ROC analysis is provided in P. J. Heagerty et al. (Biometrics 2000, 56, 337-44), the disclosure of which is hereby incorporated by reference in its entirety. Alternatively, cutoff values may be determined by a quartile analysis of biological samples of a patient group. For example, a cutoff value may be determined by selecting a value that corresponds to any value in the 25th-75th percentile range, preferably a value that corresponds to the 25th percentile, the 50th percentile or the 75th percentile, and more preferably the 75th percentile. Such statistical analyses may be performed using any method known in the art and can be implemented through any number of commercially available software packages (e.g., from Analyse-it Software Ltd., Leeds, UK; StataCorp LP, College Station, TX; SAS Institute Inc., Cary, NC.). The healthy or normal levels or ranges for a target or for a protein activity may be defined in accordance with standard practice. A control may be a subject, or a sample therefrom, whose disease state is known. The subject, or sample therefrom, may be healthy, diseased, diseased prior to treatment, diseased during treatment, diseased after treatment, or healthy after treatment, or a combination thereof. The term "normal subject" as used herein means a healthy subject, i.e. a subject having no clinical signs or symptoms of disease. The normal subject is clinically evaluated for otherwise undetected signs or symptoms of disease, which evaluation may include routine physical examination and/or laboratory testing. In some embodiments, the control is a healthy control. In some embodiments, the control comprises cancer.

The term "effective dosage" or "therapeutic dosage" or "therapeutically effective amount" or "effective amount" as used herein means an amount sufficient to elicit a therapeutic effect or a dosage of a drug effective for periods of time necessary, to achieve the desired therapeutic result. An effective dosage may be determined by a person skilled in the art and may vary according to factors such as the disease state, age, sex, and weight of the individual, the manner of administration, the stage and severity of the disease, the general state of health of the subject, the judgment of the prescribing physician, and the ability of the drug to elicit a desired response in the individual. A therapeutically effective amount is also one in which any toxic or detrimental effects of substance are outweighed by the therapeutically beneficial effects. A "prophylactically effective amount" refers to an amount effective, at dosages and for periods of time necessary, to achieve the desired prophylactic result. Typically, since a prophylactic dose is used in subjects prior to or at an earlier stage of disease, the prophylactically effective amount will be less than the therapeutically effective amount.

The terms "inhibit" or "inhibiting" mean that an activity is decreased or prevented in the presence of an inhibitor as opposed to in the absence of the inhibitor. The term "inhibition" refers to the reduction or down regulation of a process or the elimination of a stimulus for a process, which results in the absence or minimization of the expression or activity of a biomarker or polypeptide. Inhibition may be direct or indirect. Inhibition may be specific, that is, the inhibitor inhibits a biomarker or polypeptide and not others.

"Sample" or "test sample" as used herein can mean any sample in which the presence and/or level of compound or target is to be detected or determined. Samples may include liquids, solutions, emulsions, mixtures, or suspensions. Samples may include a medical sample. Samples may include any biological fluid or tissue, such as blood, whole blood, fractions of blood such as plasma and serum, peripheral blood mononuclear cells (PBMCs), muscle, interstitial fluid, sweat, saliva, urine, tears, synovial fluid, bone marrow, cerebrospinal fluid, nasal secretions, sputum, amniotic fluid, bronchoalveolar lavage fluid, gastric lavage, emesis, fecal matter, lung tissue, peripheral blood mononuclear cells, total white blood cells, lymph node cells, spleen cells, tonsil cells, cancer cells, tumor cells, bile, digestive fluid, skin, or combinations thereof. In some embodiments, the sample comprises an aliquot. In other embodiments, the sample comprises a biological fluid. Samples can be obtained by any means known in the art. The sample can be used directly as obtained from a patient or can be pre-treated, such as by filtration, distillation, extraction, concentration, centrifugation, inactivation of interfering components, addition of reagents, and the like, to modify the character of the sample in some manner as discussed herein or otherwise as is known in the art. Samples may be obtained before diagnosis, before treatment, during treatment, after treatment, or after diagnosis, or a combination thereof.

The term "specificity" as used herein refers to the number of true negatives divided by the number of true negatives plus the number of false positives, where specificity ("spec") may be within the range of 0<spec<1. Hence, a method that has both sensitivity and specificity equaling one, or 100%, is preferred.

By "specifically binds," it is generally meant that a compound or conjugate binds to a target when it binds to that target more readily than it would bind to a random, unrelated target.

"Subject" as used herein can mean a mammal that wants or is in need of the herein described compounds or methods. The subject may be a human or a non-human animal. The subject may be a mammal. The mammal may be a primate or a non-primate. The mammal can be a primate such as a human; a non-primate such as, for example, dog, cat, horse, cow, pig, mouse, rat, camel, llama, goat, rabbit, sheep, hamster, and guinea pig; or non-human primate such as, for example, monkey, chimpanzee, gorilla, orangutan, and gibbon. The subject may be of any age or stage of development, such as, for example, an adult, an adolescent, or an infant. The subject may be male or female. In some embodiments, the subject has a specific genetic marker.

As used herein, the term "toxic" refers to an amount of a chemical entity, agent, or substance that would be harmful to the subject or cause any adverse effect. The term "non-toxic" refers to a substance that has a relatively low degree to which it can damage a subject. "Cytotoxic" refers to a chemical entity, agent, or substance that is toxic to cells. Toxicity can refer to the effect on a whole organism, such as an animal, bacterium, plant, or other subject as defined herein, as well as the effect on a substructure of the organism, such as a cell (cytotoxicity) or an organ (organotoxicity), such as the liver (hepatotoxicity). A central concept of toxicology is that effects are dose-dependent; even water can lead to water intoxication when taken in large enough doses, whereas for even a very toxic substance such as snake venom there is a dose below which there is no detectable toxic effect. A composition or compound that is relatively non-toxic may allow a wider range of subjects to be able to safely handle the composition or compound, without serious safety concerns or risks.

The terms "treat," "treated," or "treating" as used herein refers to a therapeutic wherein the object is to slow down (lessen) an undesired physiological condition, disorder or disease, or to obtain beneficial or desired clinical results. For the purposes of this invention, beneficial or desired clinical results include, but are not limited to, alleviation of symptoms; diminishment of the extent of the condition, disorder or disease; stabilization (i.e., not worsening) of the state of the condition, disorder or disease; delay in onset or slowing of the progression of the condition, disorder or disease; amelioration of the condition, disorder or disease state; and remission (whether partial or total), whether detectable or undetectable, or enhancement or improvement of the condition, disorder or disease. Treatment also includes prolonging survival as compared to expected survival if not receiving treatment. "Treatment" or "treating," when referring to protection of a subject from a disease, means suppressing, repressing, ameliorating, or completely eliminating the disease. Preventing the disease involves administering a composition of the present invention to a subject prior to onset of the disease. Suppressing the disease involves administering a composition of the present invention to a subject after induction of the disease but before its clinical appearance. Repressing or ameliorating the disease involves administering a composition of the present invention to a subject after clinical appearance of the disease. The disease may comprise cancer.

2. PHOSPHOLIPID ETHERS

Provided herein are phospholipid ether (PLE) molecules. The PLE may be according to Formula I, or a salt thereof:

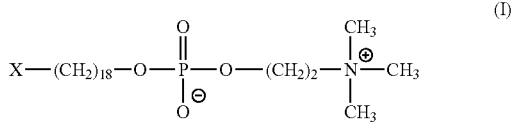

(I)

wherein X is hydrogen, methyl, or phenyl substituted with carboxyl.

In some embodiments, the PLE is selected from the following:

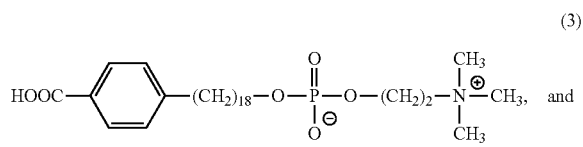

(3)

and

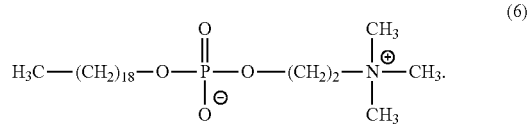

(6)

The PLE may be conjugated to a detectable moiety (also referred to as a reporter or a label), such as, for example, a fluorescent molecule, chemuminescent molecule, radiolabel, magnetic label, infrared molecule, or a combination thereof. Magnetic labels are labeling moieties that, when sufficiently associated with a magnetic proximity sensor, are detectable by the magnetic proximity sensor and cause the magnetic proximity sensor to output a signal. Magnetic labels may include one or more materials selected from paramagnetic, superparamagnetic, ferromagnetic, ferromagnetic, anti-ferromagnetic materials, combinations thereof, and the like. Fluorescent labels are labeling moieties that are detectable by a fluorescence detector. Suitable fluorescent molecules (fluorophores) include, but are not limited to, fluorescein, fluorescein isothiocyanate, succinimidyl esters of carboxyfluorescein, succinimidyl esters of fluorescein, 5-isomer of fluorescein dichlorotriazine, caged carboxyfluorescein-alanine-carboxamide, Oregon Green 488, Oregon Green 514; Lucifer Yellow, acridine Orange, rhodamine, tetramethylrhodamine, Texas Red, propidium iodide, JC-1 (5,5',6,6'-tetrachloro-1,1',3,3'-tetraethylbenzimidazoylcarbocyanine iodide), tetrabromorhodamine 123, rhodamine 6G, TMRM (tetramethyl rhodamine methyl ester), TMRE (tetramethyl rhodamine ethyl ester), tetramethylrosamine, rhodamine B and 4-dimethylaminotetramethylrosamine, green fluorescent protein, blue-shifted green fluorescent protein, cyan-shifted green fluorescent protein, red-shifted green fluorescent protein, yellow-shifted green fluorescent protein, 4-acetamido-4'-isothiocyanatostilbene-2,2' disulfonic acid; acridine and derivatives, such as acridine, acridine isothiocyanate; 5-(2'-aminoethyl)aminonaphthalene-1-sulfonic acid (EDANS); 4-amino-N-[3-vinylsulfonyl)phenyl]naphth-alimide-3,5 disulfonate; N-(4-anilino-1-naphthyl)maleimide; anthranilamide; 4,4-difluoro-5-(2-thienyl)-4-bora-3a,4a diaza-5-indacene-3-propioni-c acid BODIPY; cascade blue; Brilliant Yellow; coumarin and derivatives: coumarin, 7-amino-4-methylcoumarin (AMC, Coumarin 120),7-amino-4-trifluoromethylcoumarin (Coumarin 151); cyanine dyes; cyanosine; 4',6-diaminidino-2-phenylindole (DAPI); 5',5"-dibromopyrogallol-sulfonaphthalein (Bromopyrogallol Red); 7-diethylamino-3-(4'-isothiocyanatophenyl)-4-methylcoumarin; diethylenetriaamine pentaacetate; 4,4'-diisothiocyanatodihydro-stilbene-2-,2'-disulfonic acid; 4,4'-diisothiocyanatostilbene-2,2'-disulfonic acid; 5-(dimethylamino)naphthalene-1-sulfonyl chloride (DNS, dansylchloride); 4-dimethylaminophenylazophenyl-4'-isothiocyanate (DABITC); eosin and derivatives: eosin, eosin isothiocyanate, erythrosin and derivatives: erythrosin B, erythrosin, isothiocyanate; ethidium; fluorescein and derivatives: 5-carboxyfluorescein (FAM),5-(4,6-dichlorotriazin-2-yl)amino-1-fluorescein (DTAF), 2',7' dimethoxy-4'5'-dichloro-6-carboxyfluorescein (JOE), fluorescein, fluorescein isothiocyanate, QFITC, (XRITC); fluorescamine; IR144; IR1446; Malachite Green isothiocyanate; 4-methylumbelliferoneortho cresolphthalein; nitrotyrosine; pararosaniline; Phenol Red; B-phycoerythrin; o-phthaldialdehyde; pyrene and derivatives: pyrene, pyrene butyrate, succinimidyl 1-pyrene; butyrate quantum dots; Reactive Red 4 (Ciba-cron™ Brilliant Red 3B-A) rhodamine and derivatives: 6-carboxy-X-rhodamine (ROX), 6-carboxyrhodamine (R6G), lissamine rhodamine B sulfonyl chloride rhodamine (Rhod), rhodamine B, rhodamine 123, rhodamine X isothiocyanate, sulforhodamine B, sulforhodamine 101, sulfonyl chloride derivative of sulforhodamine 101 (Texas Red); N,N,N',N'-tetramethyl-6-carboxyrhodamine (TAMRA); tetramethyl rhodamine; tetramethyl hodamine isothiocyanate (TRITC); riboflavin; 5-(2'-aminoethyl)aminonaphthalene-1-sulfonic acid (EDANS),4-(4'-dimethylaminophenylazo)benzoic acid (DABCYL), rosolic acid; CAL Fluor Orange 560; terbium chelate derivatives; Cy 3; Cy 5; Cy 5.5; Cy 7; IRD 700; IRD 800; La Jolla Blue; phthalo cyanine; and naphthalo cyanine, coumarins and related dyes, xanthene dyes such as rhodols, resorufins, bimanes, acridines, isoindoles, dansyl dyes, aminophthalic hydrazides such as luminol, and isoluminol derivatives, aminophthalimides, aminonaphthalimides, aminobenzofurans, aminoquinolines, dicyanohydroquinones, fluorescent europium and terbium complexes; combinations thereof, and the like.

The detectable moiety may be covalently or cleavably linked to the PLE. For example, the labelled PLE may be selected from the following:

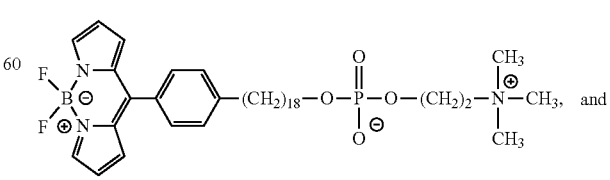

(1)

CLR 1501

-continued

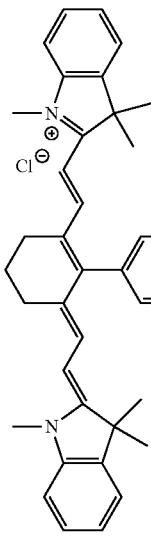

CLR 1502

The above compound (1) is PLE (3) with the fluorescent moiety, BODIPY, stably linked to the PLE, and may also be referred to as CLR 1501. The above compound (2) is PLE (3) with a near infrared molecule, IR-775, stably linked to the PLE, and may also be referred to as CLR 1502. Compounds (1) and (2) may also be referred to as a phospholipid drug conjugate (PDC).

The PLE, or a conjugate thereof, may be specific for a tumor or cancer cell. Upon administration to a subject, the PLE, or a conjugate thereof, may localize to a tumor or cancer cell. The PLE, or a conjugate thereof, may be incorporated into a tumor or cancer cell more than a healthy cell. The PLE, or a conjugate thereof, may be incorporated into at least about 2-fold, at least about 3-fold, at least about 4-fold, at least about 5-fold, at least about 6-fold, at least about 7-fold, at least about 8-fold, at least about 9-fold, at least about 10-fold, at least about 15-fold, at least about 20-fold, at least about 25-fold, at least about 30-fold more tumor or cancer cells than healthy cells.

3. PHOSPHOLIPID-FLAVAGLINE CONJUGATES

A PLE may be conjugated via a linker to a flavagline compound to form a phospholipid-flavagline conjugate (also referred to as a PLE-flavagline conjugate). The conjugate may be according to Formula II, or a salt thereof:

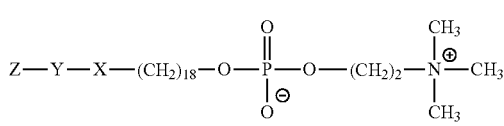

(II)

wherein X is

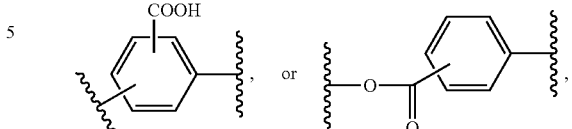

or methylene, or bond, Y is a linker comprising a disulfide; and Z is a flavagline anti-cancer drug. A conjugate of Formula II may also be referred to as a phospholipid drug conjugate (PDC).

Flavaglines are a family of natural products that are found in plants of the genus Aglaia (Meliaceae). Flavaglines are characterized by a cyclopenta[b]benzofuran skeleton. Flavaglines may have strong insecticidal, antifungal, anti-inflammatory, neuroprotective, cardioprotective, and anticancer activities. Flavaglines may enhance the efficacy of chemotherapies and/or alleviate the cardiac adverse effect of chemotherapies. Flavaglines may include, for example, FLV1, FLV3, a derivative or analog thereof, or a combination thereof.

In some embodiments, the flavagline comprises FLV1, or a salt thereof:

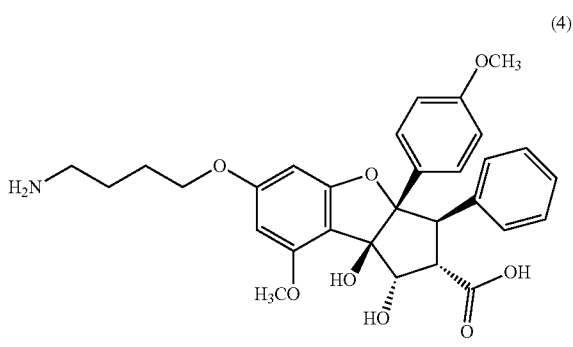

FLV1

In some embodiments, the flavagline comprises FLV3, or a salt thereof:

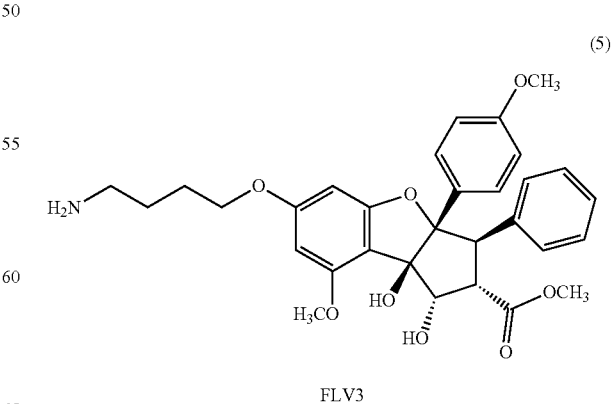

FLV3

The flavagline compound may exist as a stereoisomer wherein asymmetric or chiral centers are present. The stereoisomer is "R" or "S" depending on the configuration of substituents around the chiral carbon atom. The terms "R" and "S" used herein are configurations as defined in IUPAC 1974 Recommendations for Section E, Fundamental Stereochemistry, in Pure Appl. Chem., 1976, 45, 13-30. The disclosure contemplates various stereoisomers and mixtures thereof and these are specifically included within the scope of this invention. Stereoisomers include enantiomers and diastereomers, and mixtures of enantiomers or diastereomers. Individual stereoisomers of the compounds may be prepared synthetically from commercially available starting materials, which contain asymmetric or chiral centers or by preparation of racemic mixtures followed by methods of resolution well-known to those of ordinary skill in the art. These methods of resolution are exemplified by (1) attachment of a mixture of enantiomers to a chiral auxiliary, separation of the resulting mixture of diastereomers by recrystallization or chromatography and optional liberation of the optically pure product from the auxiliary as described in Furniss, Hannaford, Smith, and Tatchell, "Vogel's Textbook of Practical Organic Chemistry," 5th edition (1989), Longman Scientific & Technical, Essex CM20 2JE, England, or (2) direct separation of the mixture of optical enantiomers on chiral chromatographic columns, or (3) fractional recrystallization methods. It should be understood that the flavagline compound may possess tautomeric forms, as well as geometric isomers, and that these also constitute embodiments of the disclosure.

The linker may be a cleavable linker, such as a disulfide, and is specifically designed to deliver the flavagline to a tumor or cancer cell. In some embodiments, the linker comprises a disulfide. In some embodiments, the linker comprises the following:

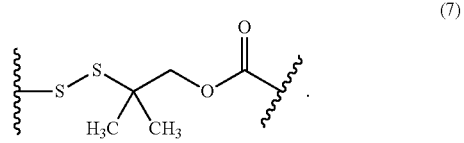

(7)

In some embodiments, the phospholipid-flavagline conjugate is selected from the following:

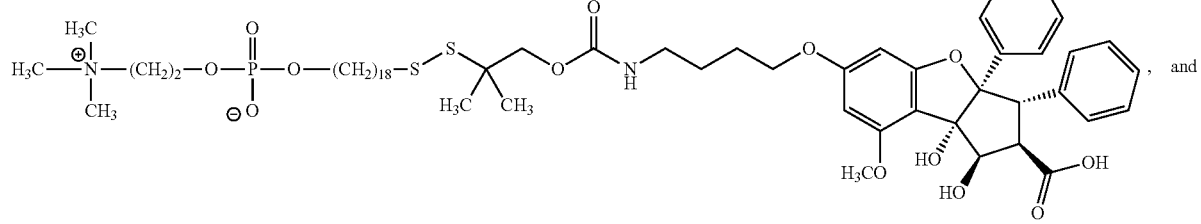

CLR 1865 (with FLV1)

(8)

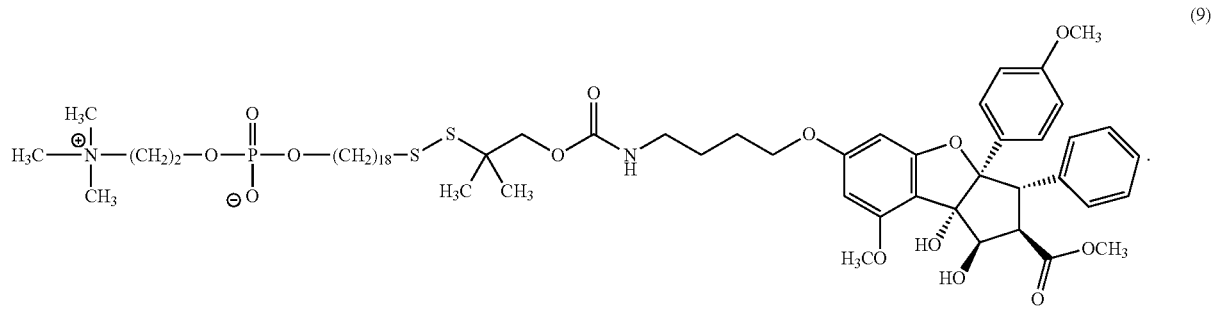

CLR 1852 (with FLV3)

(9)

The present disclosure also includes an isotopically-labeled compound, such as an isotopically-labeled PLE, an isotopically-labeled flavagline, an isotopically-labeled linker, or an isotopically-labeled phospholipid-flavagline conjugate. An isotopically-labeled compound is identical to those recited detailed herein but for the fact that one or more atoms are replaced by an atom having an atomic mass or mass number different from the atomic mass or mass number usually found in nature. Examples of isotopes suitable for inclusion in the compounds of the invention are hydrogen, carbon, nitrogen, oxygen, phosphorus, sulfur, fluorine, and chlorine, such as, but not limited to $^{2}H$, $^{3}H$, $^{13}C$, $^{14}C$, $^{15}N$, $^{18}O$, $^{17}O$, $^{31}P$, $^{32}P$, $^{35}S$, $^{18}F$, and $^{36}Cl$, respectively. Substitution with heavier isotopes such as deuterium, i.e. $^{2}H$, can afford certain therapeutic advantages resulting from greater metabolic stability, for example increased in vivo half-life or reduced dosage requirements and, hence, may be preferred in some circumstances. The compound may incorporate positron-emitting isotopes for medical imaging and positron-emitting tomography (PET) studies for determining the distribution of receptors. Suitable positron-emitting isotopes that can be incorporated in compounds are $^{11}C$, $^{13}N$, $^{15}O$, and $^{18}F$. Isotopically-labeled compounds can generally be prepared by conventional techniques known to those skilled in the art or by processes analogous to those described in the accompanying Examples using appropriate isotopically-labeled reagent in place of non-isotopically-labeled reagent.

The disclosed PLE or phospholipid-flavagline conjugate may exist as pharmaceutically acceptable salts. The term "pharmaceutically acceptable salt" refers to salts or zwitterions of the compounds which are water or oil-soluble or dispersible, suitable for treatment of disorders without undue toxicity, irritation, and allergic response, commensurate with a reasonable benefit/risk ratio and effective for their intended use. The salts may be prepared during the final isolation and purification of the compounds or separately by reacting an amino group of the compounds with a suitable acid. For example, a compound may be dissolved in a suitable solvent, such as but not limited to methanol and water and treated with at least one equivalent of an acid, like hydrochloric acid. The resulting salt may precipitate out and be isolated by filtration and dried under reduced pressure. Alternatively, the solvent and excess acid may be removed under reduced pressure to provide a salt. Representative salts include acetate, adipate, alginate, citrate, aspartate, benzoate, benzenesulfonate, bisulfate, butyrate, camphorate, camphorsulfonate, digluconate, glycerophosphate, hemisulfate, heptanoate, hexanoate, formate, isethionate, fumarate, lactate, maleate, methanesulfonate, naphthylenesulfonate, nicotinate, oxalate, pamoate, pectinate, persulfate, 3-phenylpropionate, picrate, oxalate, maleate, pivalate, propionate, succinate, tartrate, trichloroacetate, trifluoroacetate, glutamate, para-toluenesulfonate, undecanoate, hydrochloric, hydrobromic, sulfuric, phosphoric, and the like. The amino groups of the compounds may also be quaternized with alkyl chlorides, bromides and iodides such as methyl, ethyl, propyl, isopropyl, butyl, lauryl, myristyl, stearyl, and the like.

Basic addition salts may be prepared during the final isolation and purification of the disclosed compounds by reaction of a carboxyl group with a suitable base such as the hydroxide, carbonate, or bicarbonate of a metal cation such as lithium, sodium, potassium, calcium, magnesium, or aluminum, or an organic primary, secondary, or tertiary amine. Quaternary amine salts can be prepared, such as those derived from methylamine, dimethylamine, trimethylamine, triethylamine, diethylamine, ethylamine, tributylamine, pyridine, N,N-dimethylaniline, N-methylpiperidine, N-methylmorpholine, dicyclohexylamine, procaine, dibenzylamine, N,N-dibenzylphenethylamine, 1-ephenamine and N,N'-dibenzylethylenediamine, ethylenediamine, ethanolamine, diethanolamine, piperidine, piperazine, and the like.

The phospholipid-flavagline conjugate may be specific for a tumor or cancer cell. Upon administration to a subject, the phospholipid-flavagline conjugate may localize to a tumor or cancer cell. The phospholipid-flavagline conjugate may localize or travel to the cytoplasm or organelle of a tumor or cancer cell. The phospholipid-flavagline conjugate may be incorporated into a tumor or cancer cell more than a healthy cell. The phospholipid-flavagline conjugate may be incorporated into at least about 2-fold, at least about 3-fold, at least about 4-fold, at least about 5-fold, at least about 6-fold, at least about 7-fold, at least about 8-fold, at least about 9-fold, at least about 10-fold, at least about 15-fold, at least about 20-fold, at least about 25-fold, at least about 30-fold more tumor or cancer cells than healthy cells.

The flavagline may be cleaved from the PLE, such as cleavage in vivo upon administration to a subject. The flavagline may localize or travel to the cytoplasm or organelle of a tumor or cancer cell. The flavagline may be incorporated into a tumor or cancer cell more than a healthy cell. The flavagline may be incorporated into at least about 2-fold, at least about 3-fold, at least about 4-fold, at least about 5-fold, at least about 6-fold, at least about 7-fold, at least about 8-fold, at least about 9-fold, at least about 10-fold, at least about 15-fold, at least about 20-fold, at least about 25-fold, at least about 30-fold more tumor or cancer cells than healthy cells.

a. Synthesis

The PLE may be synthetically made according to Example 1. Alternatively, the PLE as detailed herein may be synthetically made by methods known to one of skill in the art. The flavagline may be synthetically made according to Example 1. Alternatively, the flavagline as detailed herein may be synthetically made by methods known to one of skill in the art. Flavaglines are also commercially available, for example, from Haoyuan Chemexpress Co. (Shanghai, China). The PLE-flavagline conjugate may be synthetically made according to Example 1. Alternatively, the PLE-flavagline conjugate as detailed herein may be synthetically made by methods known to one of skill in the art.

4. PHARMACEUTICAL COMPOSITIONS

The PLEs and phospholipid-flavagline conjugates as detailed herein may be formulated into pharmaceutical compositions in accordance with standard techniques well known to those skilled in the pharmaceutical art. The composition may comprise the compound (such as a PLE or phospholipid-flavagline conjugate) and a pharmaceutically acceptable carrier. The term "pharmaceutically acceptable carrier," as used herein, means a non-toxic, inert solid, semi-solid or liquid filler, diluent, encapsulating material or formulation auxiliary of any type.

The route by which the disclosed PLEs and phospholipid-flavagline conjugates are administered and the form of the composition will dictate the type of carrier to be used. The pharmaceutical composition may be in a variety of forms, suitable, for example, for systemic administration (e.g., oral, rectal, sublingual, buccal, implants, intranasal, intravaginal, transdermal, intravenous, intraarterial, intratumoral, intraperitoneal, or parenteral) or topical administration (e.g., dermal, pulmonary, nasal, aural, ocular, liposome delivery systems, or iontophoresis). In some embodiments, the pharmaceutical composition is for administration to a subject's central nervous system. Techniques and formulations may generally be found in "Remington's Pharmaceutical Sciences," (Meade Publishing Co., Easton, Pa.). Pharmaceutical compositions must typically be sterile and stable under the conditions of manufacture and storage. All carriers are optional in the compositions.

Pharmaceutically acceptable carriers include, for example, diluents, lubricants, binders, disintegrants, colorants, flavors, sweeteners, antioxidants, preservatives, glidants, solvents, suspending agents, wetting agents, surfactants, emollients, propellants, humectants, powders, pH adjusting agents, and combinations thereof.

Although the amounts of components in the compositions may vary depending on the type of composition prepared, in general, systemic compositions may include 0.01% to 50% of a compound (such as a PLE or phospholipid-flavagline conjugate) and 50% to 99.99% of one or more carriers. Compositions for parenteral administration may typically include 0.1% to 10% of a compound and 90% to 99.9% of one or more carriers. Oral dosage forms may include, for example, at least about 5%, or about 25% to about 50% of a compound. The oral dosage compositions may include about 50% to about 95% of carriers, or from about 50% to about 75% of carriers. The amount of the carrier employed in conjunction with a disclosed compound is sufficient to provide a practical quantity of composition for administration per unit dose of the compound. Techniques and compositions for making dosage forms useful in the methods of this invention are described in the following references: Modern Pharmaceutics, Chapters 9 and 10, Banker & Rhodes, eds. (1979); Lieberman et al., Pharmaceutical Dosage Forms: Tablets (1981); and Ansel, Introduction to Pharmaceutical Dosage Forms, 2nd Ed., (1976).

5. ADMINISTRATION

The PLE or phospholipid-flavagline conjugate, or the pharmaceutical compositions comprising the same, may be administered to a subject. Such compositions comprising a compound (such as a PLE or phospholipid-flavagline conjugate) can be administered in dosages and by techniques well known to those skilled in the medical arts taking into consideration such factors as the age, sex, weight, and condition of the particular subject, and the route of administration.

The compound (such as a PLE or phospholipid-flavagline conjugate) can be administered prophylactically or therapeutically. In prophylactic administration, the compound can be administered in an amount sufficient to induce a response. In therapeutic applications, the compounds are administered to a subject in need thereof in an amount sufficient to elicit a therapeutic effect. An amount adequate to accomplish this is defined as "therapeutically effective amount." Amounts effective for this use will depend on, e.g., the particular composition of the compound regimen administered, the manner of administration, the stage and severity of the disease, the general state of health of the patient, and the judgment of the prescribing physician. A therapeutically effective amount is also one in which any toxic or detrimental effects of a compound are outweighed by the therapeutically beneficial effects. A "prophylactically effective amount" refers to an amount effective, at dosages and for periods of time necessary, to achieve the desired prophylactic result. Typically, since a prophylactic dose is used in subjects prior to or at an earlier stage of disease, the prophylactically effective amount will be less than the therapeutically effective amount.

For example, a therapeutically effective amount of a compound may be about 1 mg/kg to about 1000 mg/kg, about 5 mg/kg to about 950 mg/kg, about 10 mg/kg to about 900 mg/kg, about 15 mg/kg to about 850 mg/kg, about 20 mg/kg to about 800 mg/kg, about 25 mg/kg to about 750 mg/kg, about 30 mg/kg to about 700 mg/kg, about 35 mg/kg to about 650 mg/kg, about 40 mg/kg to about 600 mg/kg, about 45 mg/kg to about 550 mg/kg, about 50 mg/kg to about 500 mg/kg, about 55 mg/kg to about 450 mg/kg, about 60 mg/kg to about 400 mg/kg, about 65 mg/kg to about 350 mg/kg, about 70 mg/kg to about 300 mg/kg, about 75 mg/kg to about 250 mg/kg, about 80 mg/kg to about 200 mg/kg, about 85 mg/kg to about 150 mg/kg, and about 90 mg/kg to about 100 mg/kg.

The compound can be administered by methods well known in the art as described in Donnelly et al. (*Ann. Rev. Immunol.* 1997, 15, 617-648); Feigner et al. (U.S. Pat. No. 5,580,859, issued Dec. 3, 1996); Feigner (U.S. Pat. No. 5,703,055, issued Dec. 30, 1997); and Carson et al. (U.S. Pat. No. 5,679,647, issued Oct. 21, 1997), the contents of all of which are incorporated herein by reference in their entirety. The compound can be complexed to particles or beads that can be administered to an individual, for example, using a vaccine gun. One skilled in the art would know that the choice of a pharmaceutically acceptable carrier, including a physiologically acceptable compound, depends, for example, on the route of administration.

The compound can be delivered via a variety of routes. Typical delivery routes include parenteral administration, e.g., intradermal, intramuscular or subcutaneous delivery. Other routes include oral administration, intranasal, intravaginal, transdermal, intravenous, intraarterial, intratumoral, intraperitoneal, and epidermal routes. In some embodiments, the compound is administered intravenously, intraarterially, or intraperitoneally to the subject. In some embodiments, the compound is administered to the subject intravenously. In some embodiments, the compound is administered to the subject orally.

In some embodiments, the compound is administered in a controlled release formulation. The compound may be released into the circulation, for example. In some embodiments, the compound may be released over a period of at least about 1 day, at least about 2 days, at least about 3 days, at least about 4 days, at least about 5 days, at least about 6 days, at least about 7 days, at least about 1 week, at least about 1.5 weeks, at least about 2 weeks, at least about 2.5 weeks, at least about 3.5 weeks, at least about 4 weeks, or at least about 1 month.

The compound can be administered in a single dose or episodically or in repeated doses. For example, the compound may be administered once every hour, 2 hours, 4 hours, 8 hours, 12 hours, 25 hours, 36 hours, 2 days, 3 days, 4 days, 5 days, 6 days, 1 week, 2 weeks, 3 weeks, or 4 weeks.

6. METHODS a. Methods of Treating Cancer in a Subject

Provided herein are methods of treating cancer in a subject. The method may include administering to the subject a phospholipid-flavagline conjugate as detailed herein. In some embodiments, the cancer is selected from melanoma, brain cancer, lung cancer, adrenal cancer, liver cancer, renal or kidney cancer, pancreatic cancer, esophageal cancer, gastric cancer, stomach cancer, colon cancer, colorectal cancer, anal cancer, prostate cancer, ovarian cancer, breast cancer, cervical cancer, lymphoma, leukemia, myeloma, hematologic cancer, hepatocarcinoma, retinoblastoma, glioma, sarcoma, blastoma, squamous cell carcinoma, and adenocarcinoma.

b. Methods of Targeting a Drug to a Tumor or Cancer Cell in a Subject

Provided herein are methods of targeting a drug to a tumor or cancer cell in a subject. The method may include administering to the subject a phospholipid-flavagline conjugate as detailed herein. In some embodiments, the cancer is selected from melanoma, brain cancer, lung cancer, adrenal cancer, liver cancer, renal or kidney cancer, pancreatic cancer, esophageal cancer, gastric cancer, stomach cancer, colon cancer, colorectal cancer, anal cancer, prostate cancer, ovarian cancer, breast cancer, cervical cancer, lymphoma, leukemia, myeloma, hematologic cancer, hepatocarcinoma, retinoblastoma, glioma, sarcoma, blastoma, squamous cell carcinoma, and adenocarcinoma.

7. EXAMPLES
Example 1
Chemical Synthesis
PLEs. The PLEs were synthetically made according to Scheme 1 below:
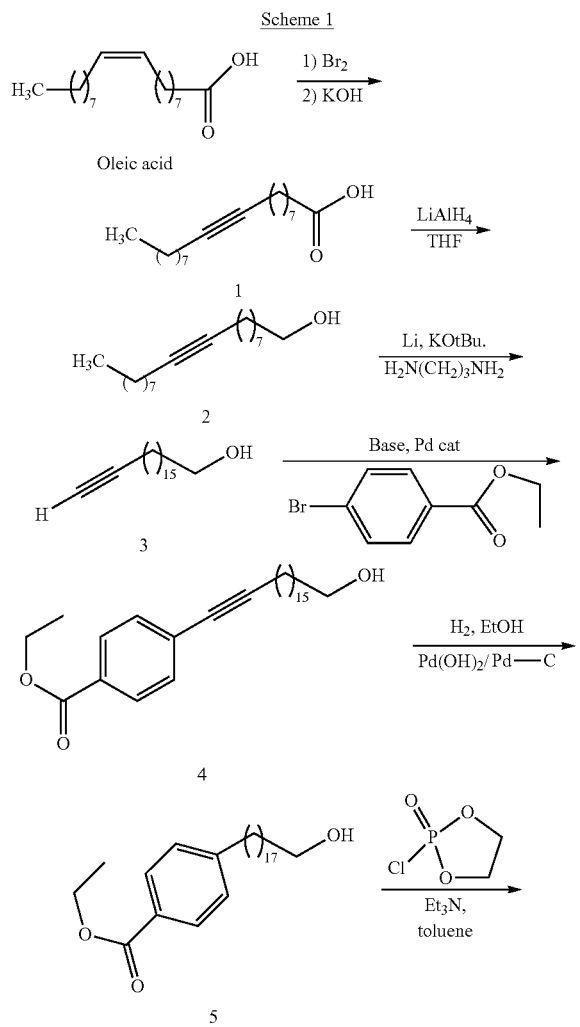
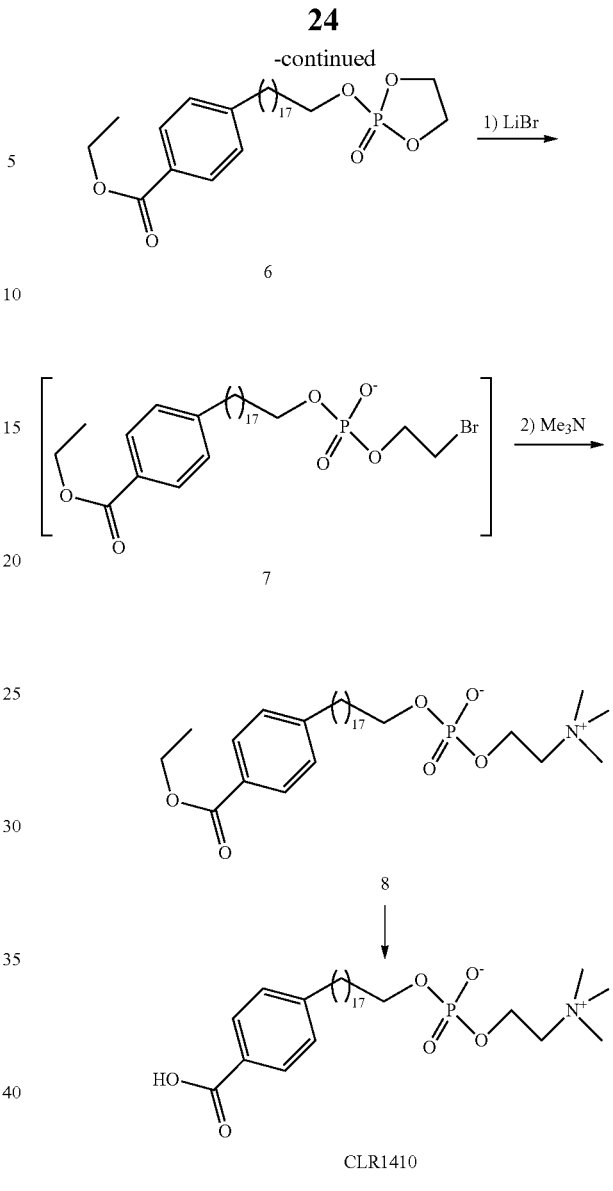
Flavaglines. Flavaglines were commercially available. FLV1 and FLV3 were purchased from Haoyuan Chemexpress Co. (Shanghai, China). FLV1 and FLV3 were alternatively synthetically made according to Scheme 2 below:
SCHEME 2
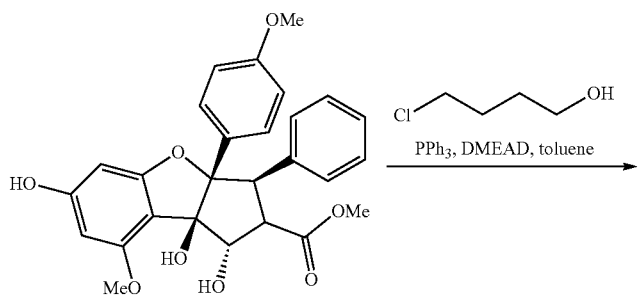

SCHEME 2-continued
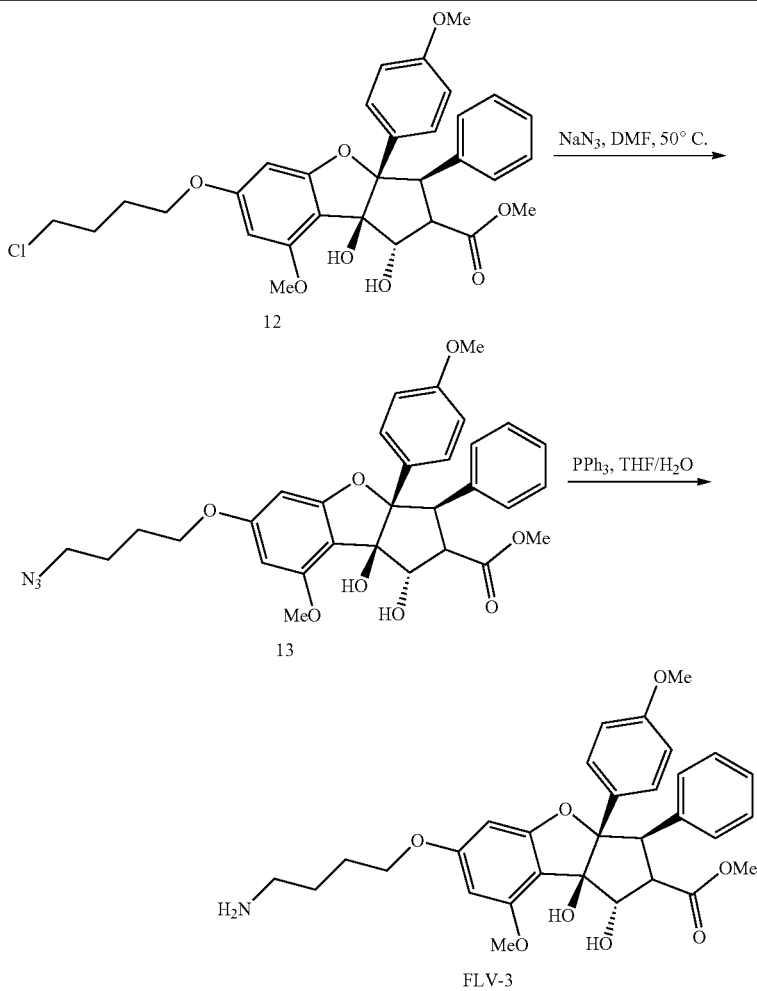
| Entry | SM | Scale | Product | Conditions | Yield | Comments |
|---|---|---|---|---|---|---|
| 1 | 13 | 0.317 g | FLV3 | 50° C., 10 h | 0.235 g (78%) | ¹H NMR consistent. |
| 2 | 11 | 0.170 g | 12 | 0° C. to rt, O/N | — | Reaction in progress. |
PLE-flavagline constructs. CLR 1852 (compound (9)) and CLR 1865 (compound (8)) were synthetically made according to Scheme 3 below:
Scheme 3
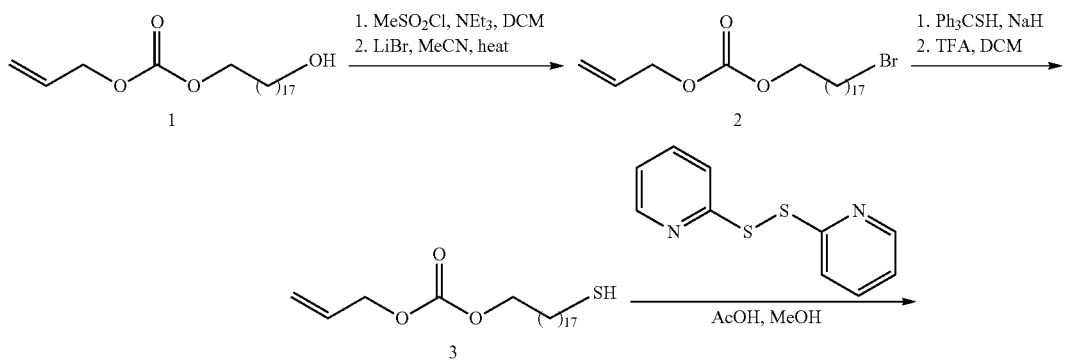

-continued
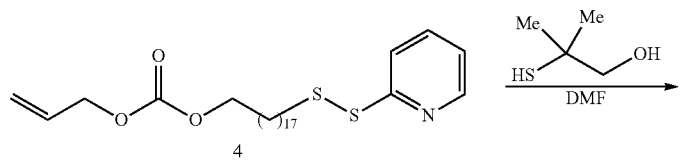
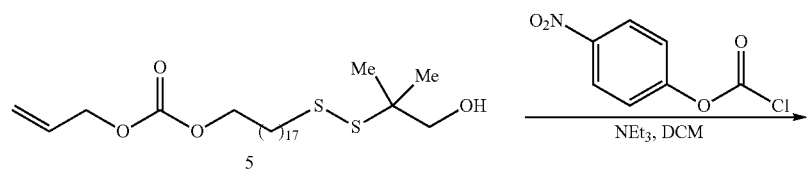
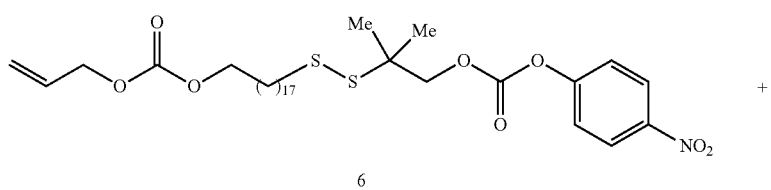
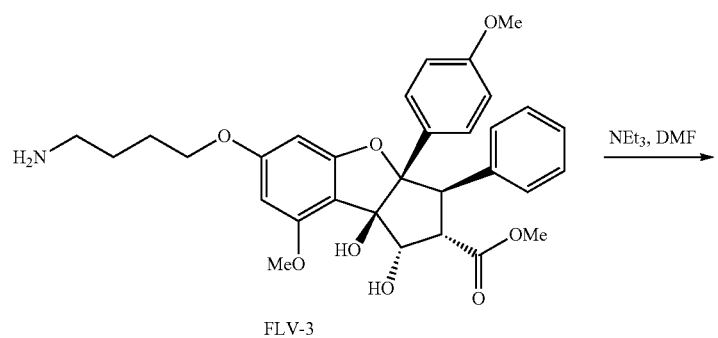
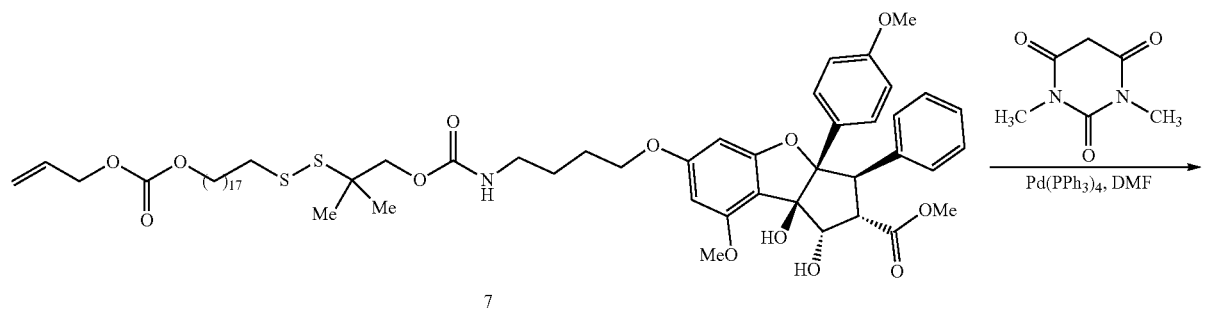
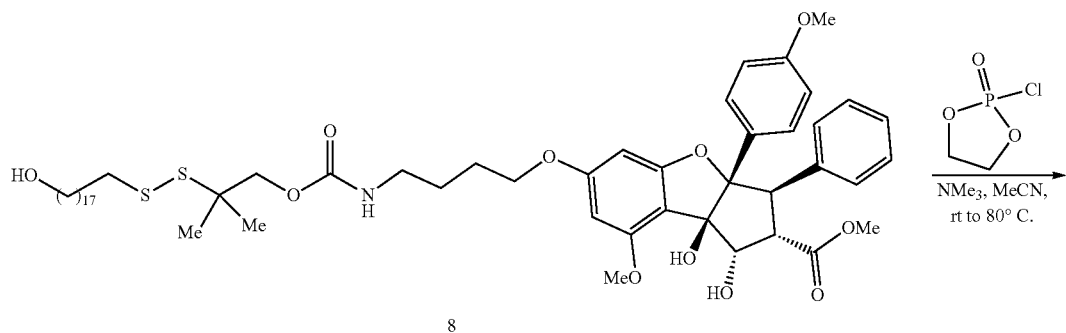

-continued

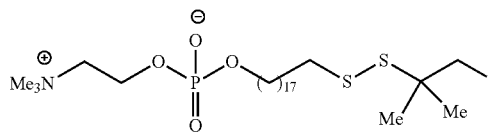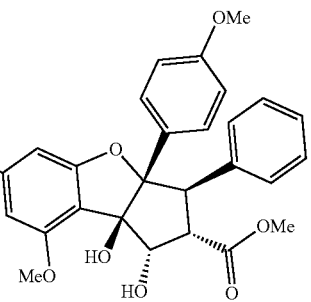

G

Example 2

Presence of Lipid Rafts on Tumor Cells

Figure 1E:
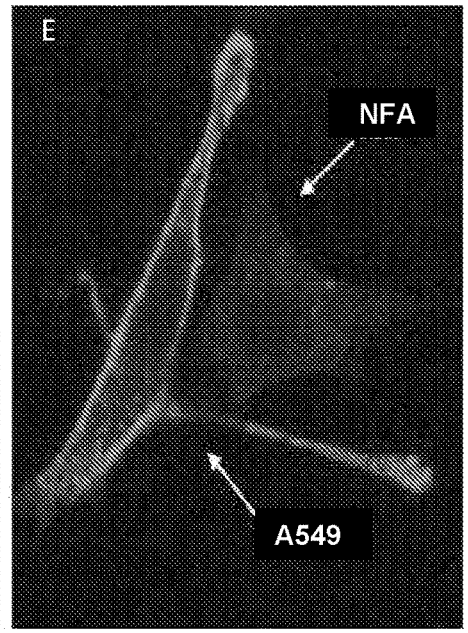

Over 100 cell lines were stained with cholera toxin subunit B, fixed with 4% formaldehyde, and stained with filipin III for 30 minutes. As shown in FIG. 1A-FIG. 1D, almost every tumor type that was tested demonstrated high lipid raft concentration in the cell membrane (over 100 cell lines, fresh patient samples, etc.). As shown in FIG. 1E, A549 cells were co-cultured with normal fibroblast cells for 48 hours and then stained with cholera toxin subunit B, fixed with 4% formaldehyde, and stained with filipin III for 30 minutes. These results demonstrated that tumor cells possess a higher concentration of lipid rafts than normal cells.

Example 3

Selective Uptake of PDCs into Tumor Cells

Figure 1F:
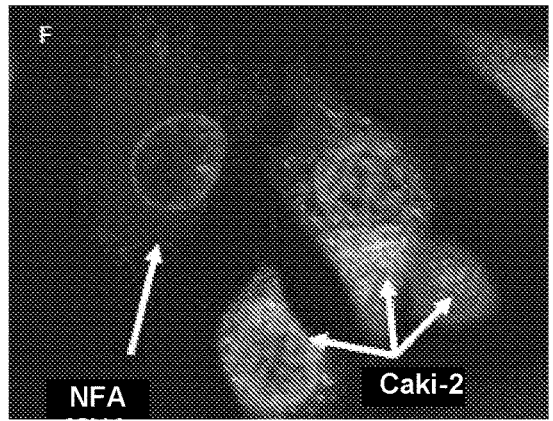
FIG. 1F is an image of normal fibroblasts and Caki-2 tumor cells with CLR 1501 (compound (1)). CLR 1501 was highly localized in Caki-2 cells and minimally in normal fibroblasts.

Normal fibroblast and Caki-2 tumor cells (human clear cell renal cell carcinoma) were plated and co-cultured overnight (FIG. 1F). Cells were then incubated with 5 µM of CLR 1501 (compound (1)) for 24 hours at 37° C. in complete media. The next day cells were washed and co-stained with nucleus stain (Hoescht 33342). CLR 1501 was excited and then detected with an Alexa-Fluor 488 filter. CLR 1501 was highly localized in the Caki-2 cells and minimally in the normal fibroblast cells.

Example 4

Disruption of Lipid Rafts Reduced Uptake of PDCs

Figure 1G:
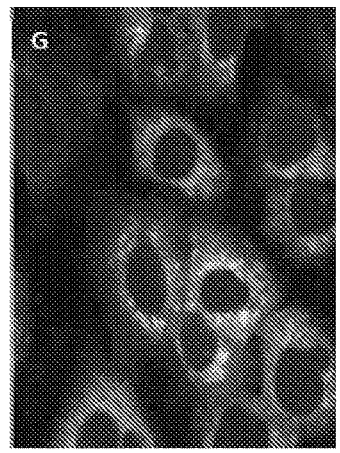
FIG. 1G is an image of control A549 cells.
Figure 1H:
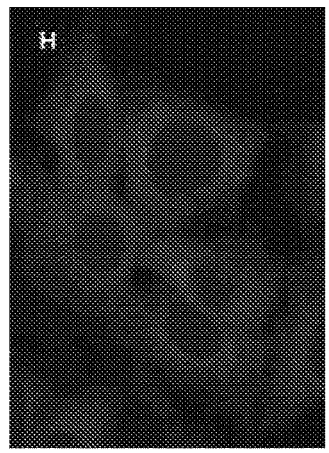
FIG. 1H is an image of A549 cells treated with methyl b-cyclodextrin to disrupt lipid rafts. Cells in both FIG. 1G and FIG. 1H were incubated with CLR 1501 (compound (1)), and disruption of the majority of lipid rafts in A549 cells resulted in 60% reduction in uptake of CLR 1501 (compound (1)).

A549 cells were plated overnight into separate wells. The following day cells were either not treated (FIG. 1G) or treated with methyl b-cyclodextrin (FIG. 1H) which has been shown to selectively disrupt lipid rafts. All cells were then incubated for 24 hours with 5 µµM of CLR 1501 (compound (1)). Disruption of the majority of lipid rafts in A549 cells resulted in 60% reduction in uptake of CLR 1501 (FIG. 1H) as compared to untreated cells (FIG. 1G).

Example 5

PDCs Track to Endoplasmic Reticulum

Figure 1I:
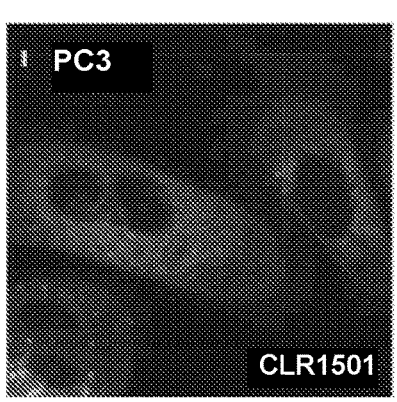
FIG. 1I, FIG. 1J, and FIG. 1K are images of PC3 cells incubated with CLR 1501 (compound (1)) and stained for endoplasmic reticulum (ER). CLR 1501 (compound (1)) co-localized with ER in malignant cells but not normal cells (not shown).
Figure 1J:
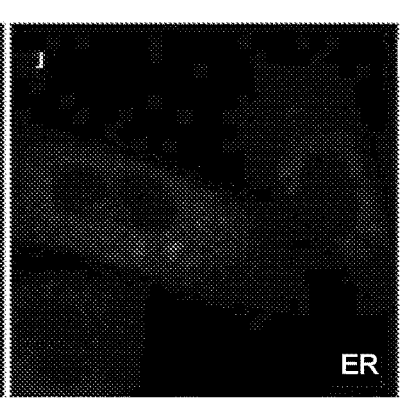
Figure 1K:
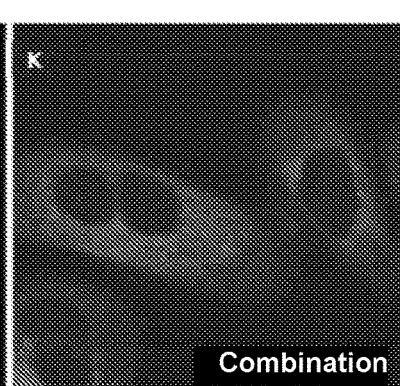

Human prostate adenocarcinoma cells (PC3) were plated overnight on the microplate VI (Ibidi, Verona, WI) and then incubated with 5 µM of CLR 1501 (compound (1)) for 24 hours at 37° C. in complete media. After washing, the cells were co-stained with ER-tracker® per protocol and imaged using Nikon A1R confocal light microscope. CLR 1501 and ER were excited and detected using Alexa-Fluor 488 using standard fluorescein filters. CLR 1501 co-localized with ER in malignant (FIG. 1I-FIG. 1K) but not with normal cells (not shown).

Example 6

PDCs Track to Endoplasmic Reticulum

Figure 1L:
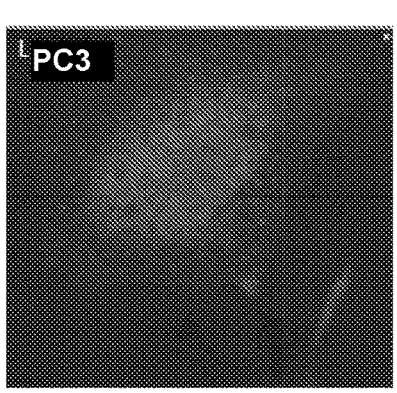
FIG. 1L, FIG. 1M, and FIG. 1N are images of PC3 cells incubated with CLR 1501 (compound (1)) and stained for the nucleus and mitochondria. CLR 1501 (compound (1)) co-localized with mitochondria.
Figure 1M:
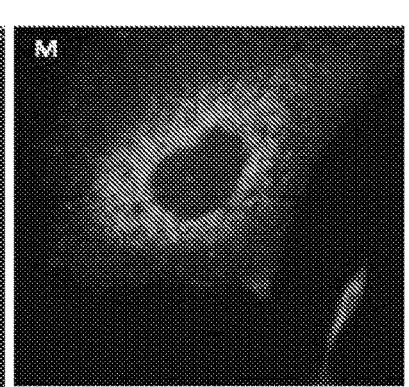
Figure 1N:
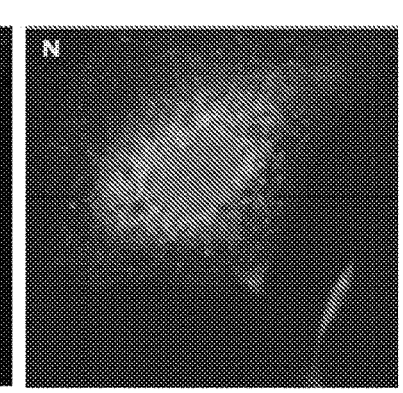

PC3 (grade IV, human prostate adenocarcinoma) cell lines were cultured overnight on micro slide VI (Ibidi, Verona, WI). The next day, the cells were incubated with 5 µM of CLR 1501 (compound (1)) for 24 hours at 37° C. in complete media. The next day after washing with PBS, the cells were co-stained with nucleus stain (Hoechst 33342) and mitochondria marker (Mitotracker®) (Invitrogen, Carlsbad, CA). The cells were observed using Nikon A1R confocal microscope. CLR 1501 was excited and detected using Alexa-Fluor 488 filter, while nucleus stain and mitochondria stain were excited and detected using DAPI filter and Texas-Red filter, respectively. CLR 1501 was co-localized with mitochondria (FIG. 1L-FIG. 1N).

Example 7

PDCs Provide Targeted Delivery In Vivo

Figure 2:
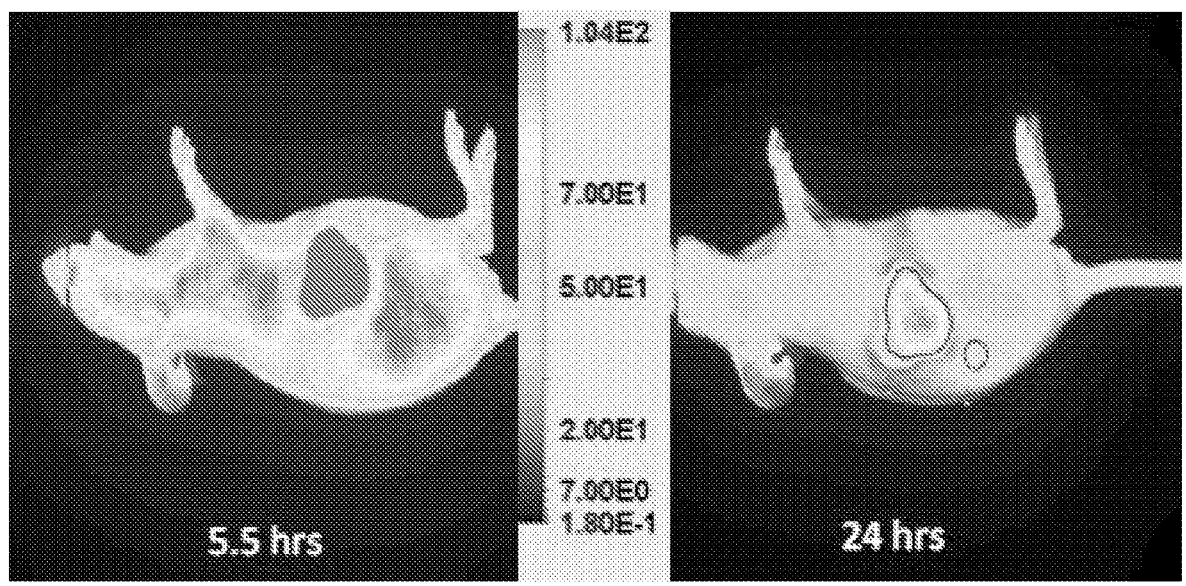
FIG. 2 is an image of a colorectal (HCT-116) tumor bearing mouse injected with CLR 1502 (compound (2)), showing localization to the tumor.

Colorectal (HCT-116) tumor bearing nude mouse was injected with 1 mg of CLR 1502 (compound (2)) and imaged on Pearl Infrared Imaging System. Different color reflects the intensity of CLR 1502 over time. Approximately 5.5 hours post injection, the tumor still showed red color (reflecting the highest distribution of CLR 1502)(FIG. 2). Within 24 hours, the maximum distribution of CLR 1502 was obtained. Initial targeting noted within 30 minutes (not shown).

Example 8

Cytotoxic PDCs Provide Targeting and Potentially Improved Therapeutic Index

Figure 3:
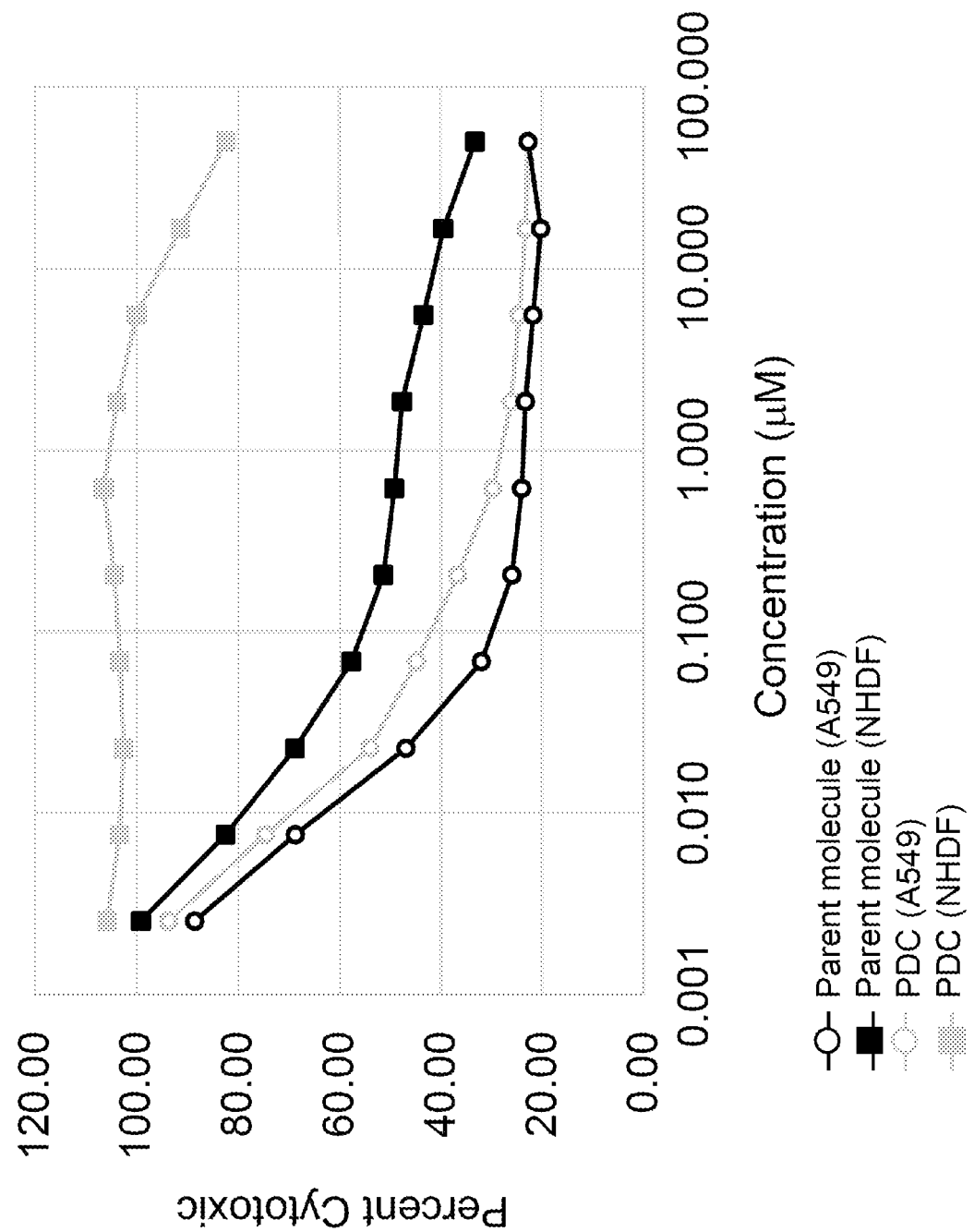
FIG. 3 is a graph of cytotoxicity versus concentration for a cytotoxic compound (FLV1) compared to the cytotoxic compound conjugated to a PLE (CLR 1865, compound (8)) in A549 (human lung adenocarcinoma) cells or normal human dermal fibroblasts (NHDF).

A549 (human lung adenocarcinoma) cells and normal human dermal fibroblasts (NHDF) were plated in 96 well dishes overnight. All cells were treated with increasing concentrations of either the parent cytotoxic compound alone (FLV1 or FLV3) or the PDC (parent cytotoxic compound conjugated to PLE moiety with cleavable linker, CLR 1865 (compound (8)) or CLR 1852 (compound (9))). Parent cytotoxic compound showed near equal potency to the A549 cells as it did to the NHDF cells. However, the PDC molecules showed selectivity for the A549 cells (FIG. 3). The PDC molecules showed almost no effect on NHDF cells until the highest concentrations and near similar potency to the parent molecule in A549 cells. The difference between the cytotoxicity of the PDC molecule for tumor cells and that of the normal cells may have indicated a potential to improve the parent molecules therapeutic index.

Example 9

Cytotoxic PDCs Provide Targeting

Figure 4:
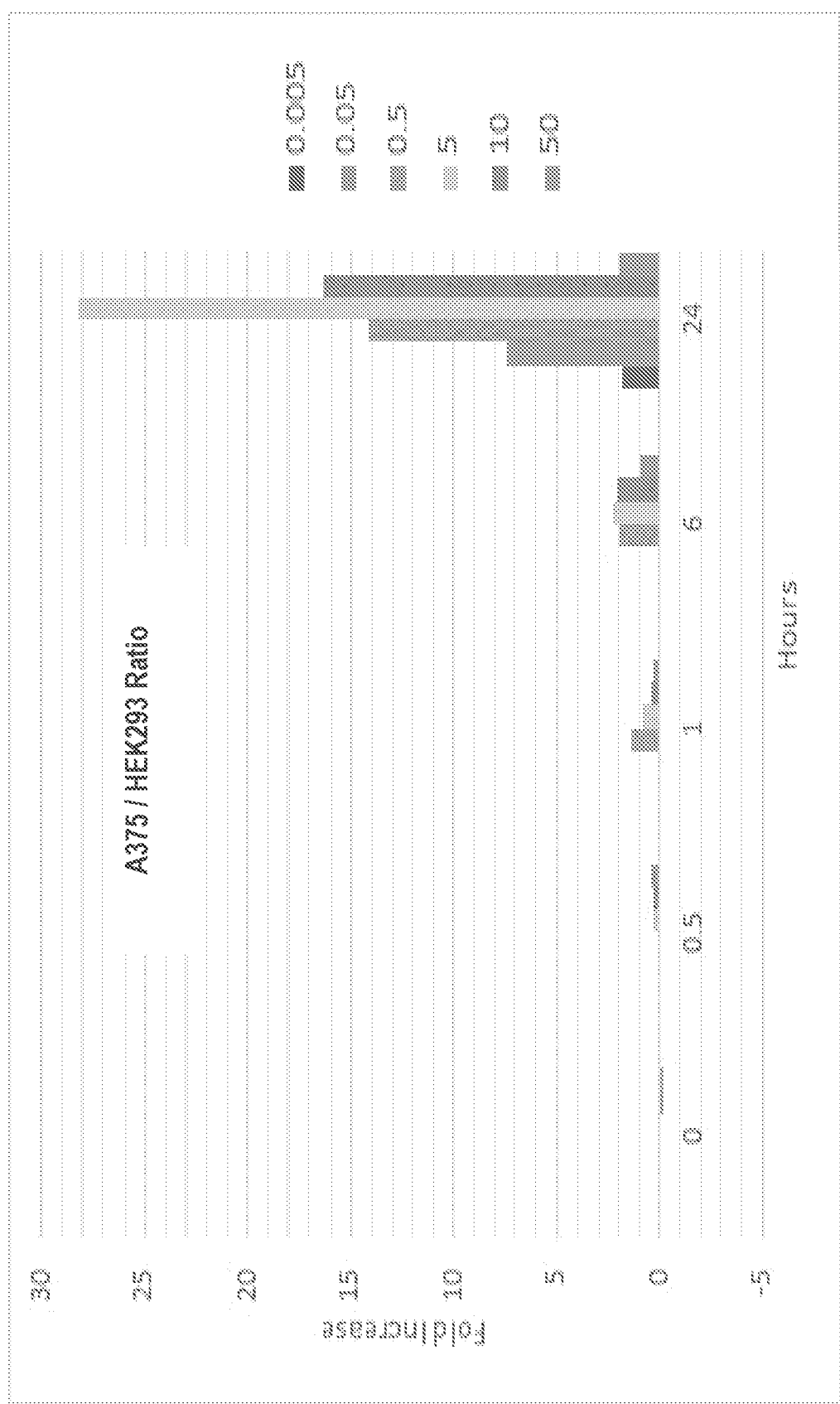
FIG. 4 is a graph of fold increase versus time for the uptake of the PLE conjugate CLR 1852 (compound (9)) in A375 (human melanoma) and HEK293 (human embryonic kidney) cells.

The uptake of CLR 1852 (compound (9)) in A375 (human melanoma) and HEK293 (human embryonic kidney) cells was evaluated. The cells were incubated with CLR 1852 (compound (9)) for 24 hours. It was shown that the tumor cells possessed anywhere from a 6 to 28 fold increase in PDCs compared to the normal cells within 24 hours of treatment (FIG. 4).

Results from Examples 2-9 indicated that phospholipid ether molecules target tumor cells via lipid rafts. PDCs showed significant uptake into tumor cells versus normal cells even in co-culture. Upon entering the tumor cells, PDCs tracked to the mitochondria and endoplasmic reticulum. In vivo, the PDCs both targeted and rapidly accumulated within the tumor. Cytotoxic PDCs provided improved targeting and the potential for improved safety.

Example 10

Cellular Uptake of PLE

Figure 5:
FIG. 5 are images of a breast cancer model in mice, showing in vivo uptake of CLR 1502 (compound (2)).
Figure 6:
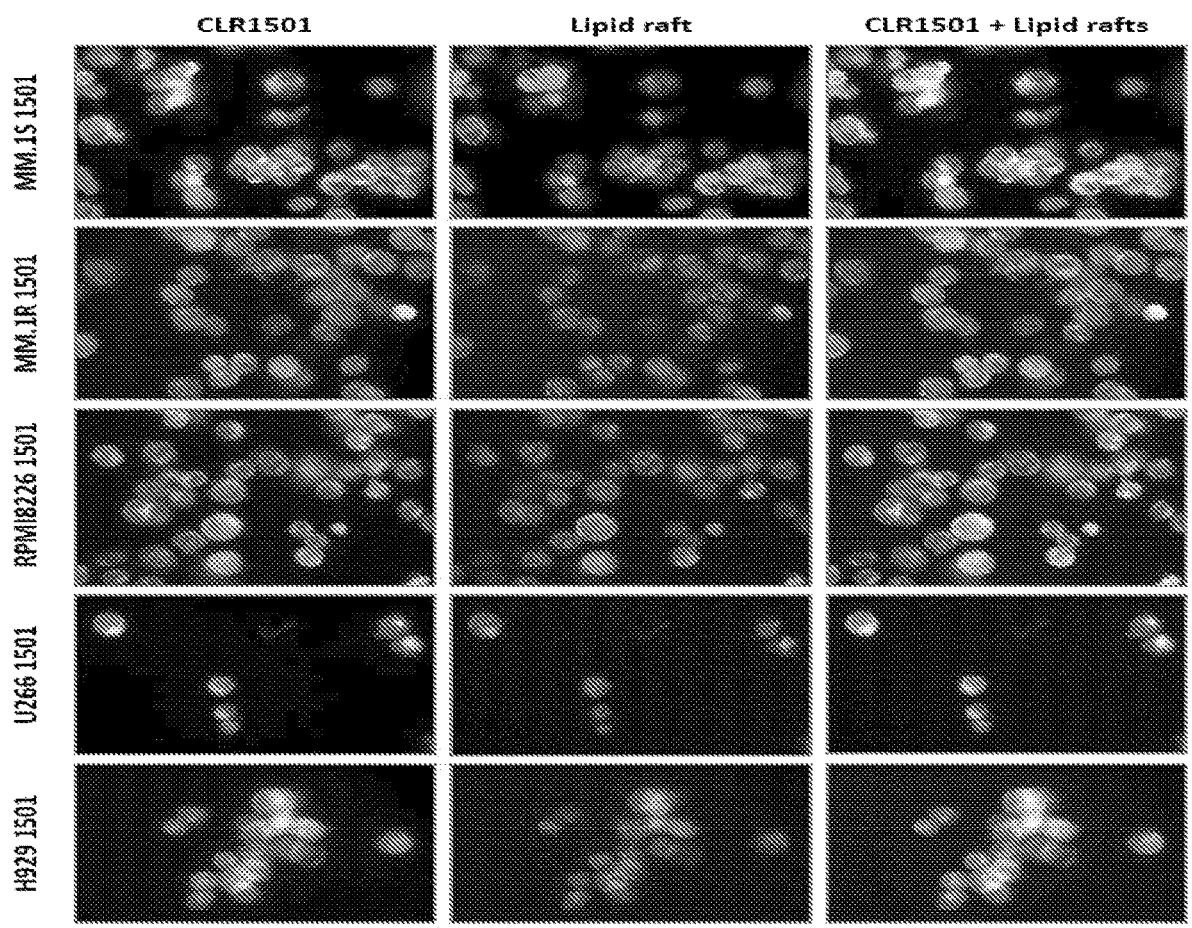
FIG. 6 are images of myeloma cell lines, showing the uptake of CLR 1501 (compound (1)).
Figure 7:
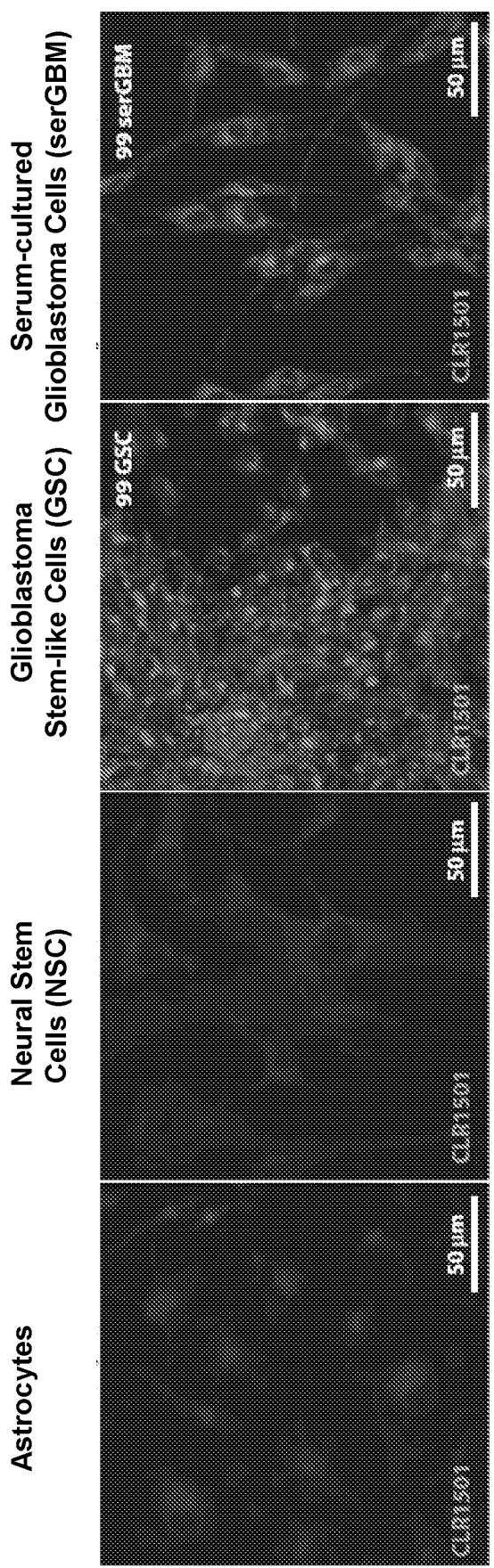
FIG. 7 are images of cancer stem cells, normal brain tissue, and normal stem cells, showing the specific uptake of CLR 1501 (compound (1)) into the cancer cells.

Various cancer cell lines were exposed in vitro and in vivo to a fluorescently labelled PLE (CLR 1501, compound (1)). Tumor cell uptake was measured continuously for 24 hours. Results are shown in TABLE 1 and FIG. 5, FIG. 6, and FIG. 7. The PLE compound was specific for tumors and cancer cells.

Fluorescently labelled PLE (CLR 1501, compound (1)) was administered to benign tissues, and no uptake was observed (TABLE 2).

TABLE 1

In vitro cellular uptake of PLE.

| | Tumor Model | Species | Category | Tumor Uptake |
|---|---|---|---|---|
| 1 | Prostate PC-3 | SCID Mouse | Adenocarcinoma | Yes |
| 2 | Lung A-549 (NSCLC) | SCID Mouse | Adenocarcinoma | Yes |
| 3 | Lung NCI H-69 (Oat Cell) | SCID Mouse | Adenocarcinoma | Yes |
| 4 | Adrenal H-295 | SCID Mouse | Adenocarcinoma | Yes |
| 5 | Adrenal RL-251 | SCID Mouse | Adenocarcinoma | Yes |
| 6 | Colon-51 | SCID Mouse | Colorectal adenocarcinoma | Yes |
| 7 | ColonLS180 | SCID Mouse | Colorectal adenocarcinoma | Yes |
| 8 | Colon DLDI | SCID Mouse | Colorectal adenocarcinoma | Yes |
| 9 | Colon HT-29 | SCID Mouse | Colorectal adenocarcinoma | Yes |
| 10 | Colon LS-180 | Nude Mouse | Adenocarcinoma | Yes |
| 11 | Melanoma A-375 | Nude Mouse | Adenocarcinoma | Yes |
| 12 | Ovarian HTB-77 | Nude Mouse | Adenocarcinoma | Yes |
| 13 | Pancreatic BXPC3 | Nude Mouse | Adenocarcinoma | Yes |
| 14 | Pancreatic Capan-1 | Nude Mouse | Adenocarcinoma | Yes |
| 15 | Renal Cell Caki-2 | Nude Mouse (orthotopic) | Adenocarcinoma | Yes |
| 16 | Renal Cell ACHN | Nude Mouse (orthotopic) | Adenocarcinoma | Yes |
| 17 | SCC1 | Nude Mouse | Squamous cell carcinoma | Yes |
| 18 | SCC6 | Nude Mouse | Adenocarcinoma | Yes |
| 19 | Prostate LnCap | Mouse | Adenocarcinoma | Yes |
| 20 | Prostate LuCap | Mouse | Adenocarcinoma | Yes |
| 21 | Breast MCF-7 | Rat | Adenocarcinoma | Yes |
| 22 | Breast 4T1 | Endogenous Mouse (orthotopic) | Adenocarcinoma | Yes |
| 23 | Prostate MatLyLu | Rat | Adenocarcinoma | Yes |
| 24 | Walker-256 | Rat | Carcinosarcoma | Yes |
| 25 | TRAMP prostate | Endogenous Mouse | Adenocarcinoma | Yes |
| 26 | Colon CT-26 | SCID Mouse | Adenocarcinoma | Yes |
| 27 | Min Mouse Intestinal | Endogenous Mouse | Adenocarcinoma | Yes |
| 28 | Melanoma | Mouse | Adenocarcinoma | Yes |
| 29 | Mammary SCC | Apc$^{Min/+}$ mouse | Squamous cell carcinoma | Yes |
| 30 | Mammary AC | Apc$^{Min/+}$ mouse | Adenocarcinoma | Yes |
| 31 | Hepatocellular Carcinoma | Endogenous Mouse | Adenocarcinoma | Yes |
| 32 | Glioma L9 | Rat xenograft | Glioma | Yes |
| 33 | Glioma C6 | Rat xenograft | Glioma | Yes |
| 34 | Glioma CNS1 | Rat xenograft | Glioma | Yes |
| 35 | Glioma RG2 | Rat xenograft | Glioma | Yes |
| 36 | Retinoblastoma | Endogenous Mouse | Blastoma | Yes |
| 37 | Pancreatic c-myc | Endogenous Mouse | Adenocarcinoma | Yes |
| 38 | Pancreatic Kras | Endogenous Mouse | Adenocarcinoma | Yes |
| 39 | Cervical | Endogenous Mouse | Adenocarcinoma | Yes |
| 40 | Sarcoma (Meth-A) | Nude Mouse | Fibrosarcoma | Yes |
| 41 | Esophageal | Endogenous Mouse | Adenocarcinoma | Yes |

TABLE 2

CLR1404 uptake in benign tissues.

| | Tumor Model | Species | Category | Tumor Uptake |
|---|---|---|---|---|
| 1 | Intestinal Polyp | Endogenous Mouse | Adenoma (benign) | No |
| 2 | Mammary alveolar hyperplasia | Endogenous Mouse | Hyperplasia (benign) | No |

Example 11

Activity of PLE-Flavagline Conjugates in Cancer Cells

The PLE-flavagline conjugates CLR 1852 (compound (9)) and CLR 1865 (compound (8)) were administered to cell lines A375 (human malignant melanoma), A549 (human lung adenocarcinoma), HCT 116 (human colon cancer), and NHDF (normal human dermal fibroblasts). The $IC_{50}$ was calculated. Results are shown in TABLE 3.

TABLE 3

$IC_{50}$ (µM/mL) in various cancer cell lines.

| Compound | A375 | A549 | HCT 116 | NHDF | Therapeutic Index (TI) |
|---|---|---|---|---|---|
| FLV3 | 0.015 | 0.09 | 0.009 | 0.008 | 0.89 |
| CLR 1852 | 0.9 | 0.02 | 0.06 | 7.2 (18.3) | 360 (915) |
| CLR 1865 | 9.75 | 0.67 | 1.28 | 7.8 (25) | 11.64 (37.3) |

Figure 8:
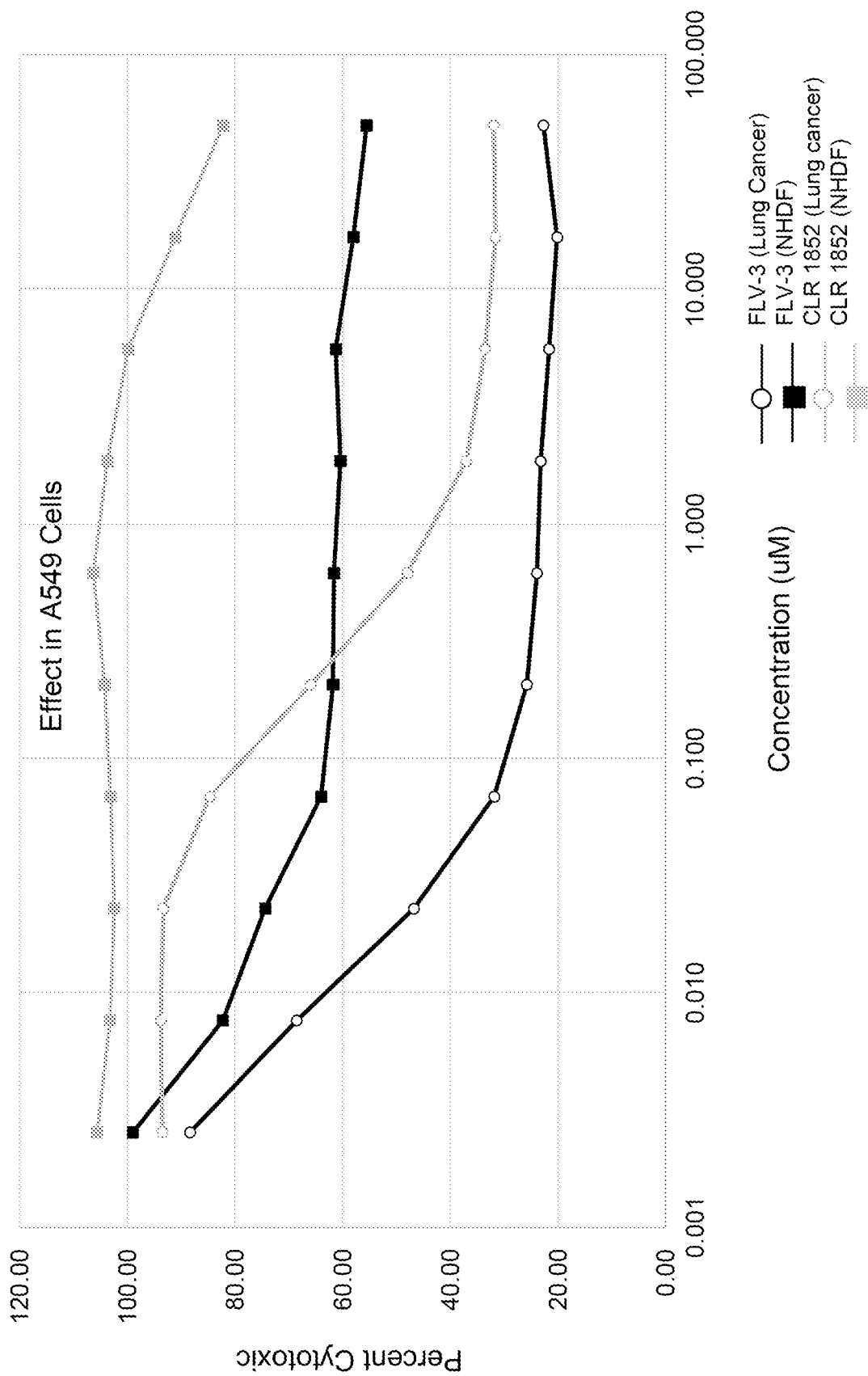
FIG. 8 is a graph of the percent cytotoxicity versus concentration for CLR 1852 (compound (9)) compared to FLV3 in A549 (human lung adenocarcinoma) cells and normal human dermal fibroblasts (NHDF).

The cytotoxicity of CLR 1852 was determined over various concentrations. As shown in FIG. 8, CLR 1852 showed modest loss in potency compared to FLV3 alone, perhaps due to incomplete release.

The stability of CLR 1865 (compound (8)), CLR 1852 (compound (9)), and FLV3 in plasma was examined, with propantheline as a control (TABLE 4). A small amount of molecule was exposed to plasma, and the plasma was then analyzed via HPLC or MS to determine if the molecule was degraded. CLR 1865 and CLR 1852 showed excellent human plasma stability. CLR 1852 outperformed CLR 1865 in mouse plasma. CLR 1865 was only stable in mouse plasma for 3.3 hours. CLR 1852 was stable in plasma for at least 7 hours.

TABLE 4

Plasma stability.

| Compound | Human half-life (min) | Mouse half-life (min) |
|---|---|---|
| CLR 1852 | >400 | >400 |
| CLR 1865 | >400 | 199 |
| propantheline | 54 | 85 |

The therapeutic index (TI) of CLR 1865 and CLR 1852 was examined in mice (TABLE 5). Listed in Table 5 are the doses administered to the mice, and how many mice were alive after treatment ("3/3" indicates 3 out of 3 mice were alive). Both CLR 1852 and CLR 1865 showed excellent improvement in tolerability compared to FLV3 alone. CLR 1852 did not achieve a maximum tolerated dose (MTD), perhaps because its solubility limited greater dosing. MTD for CLR 1865 was between 5 and 10 mg/kg. The in vivo therapeutic index was at least 25 for CLR 1852 and 12.5 for CLR 1865.

TABLE 5

In vivo therapeutic index.

| Dose (mg/kg) | FLV3 | CLR 1852 | CLR 1865 |
|---|---|---|---|
| 0.1 | 3/3 | 3/3 | 3/3 |
| 0.25 | 3/3 | 3/3 | 3/3 |
| 0.5 | LD | 3/3 | 3/3 |
| 1.0 | n/a | 3/3 | 3/3 |
| 5.0 | n/a | 3/3 | 3/3 |
| 10.0 | n/a | 3/3 | 2/3 |

Figure 9:
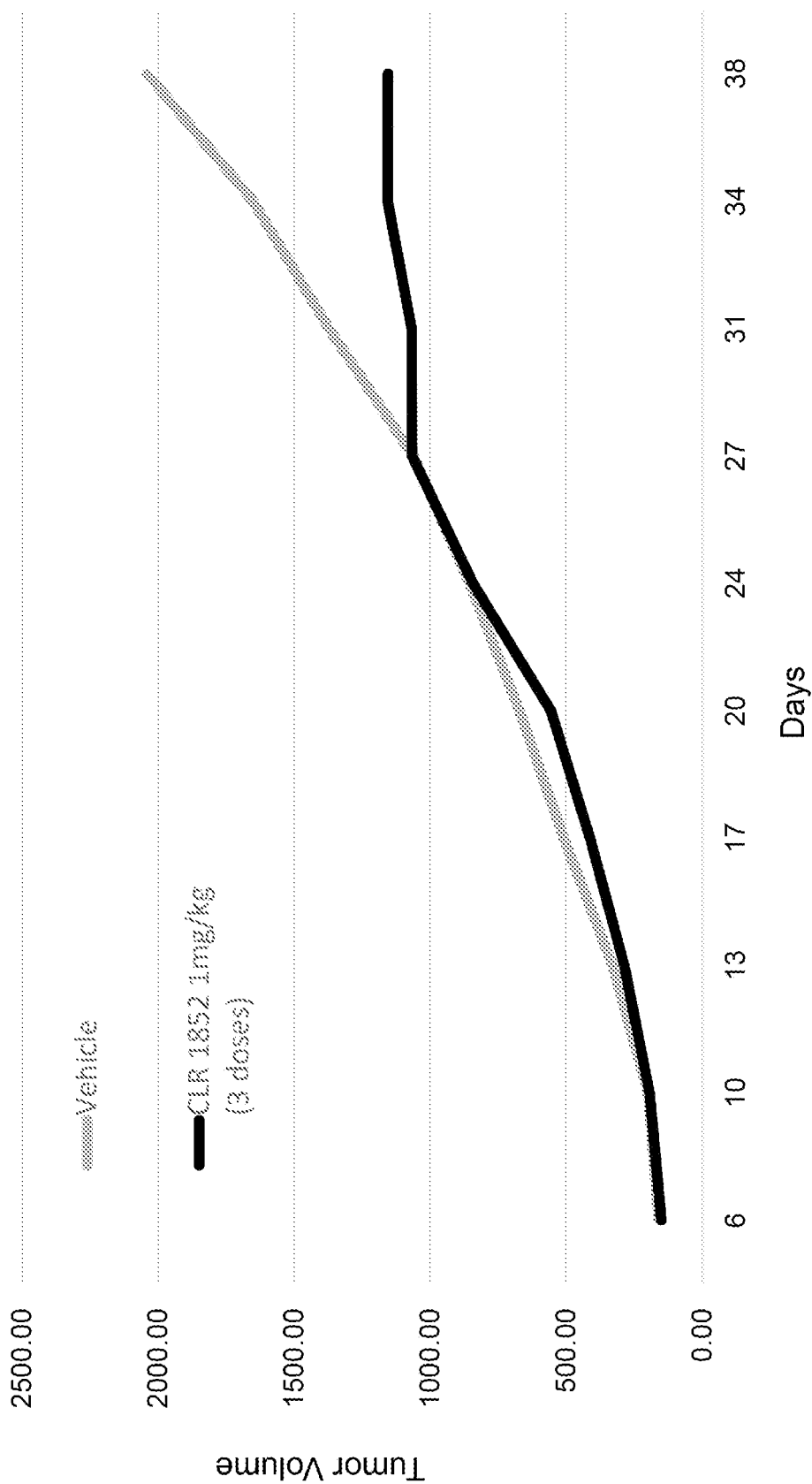
FIG. 9 is a graph of tumor volume versus time for vehicle compared to CLR 1852 (compound (9)) in a HCT 116 tumor model.
Figure 10:
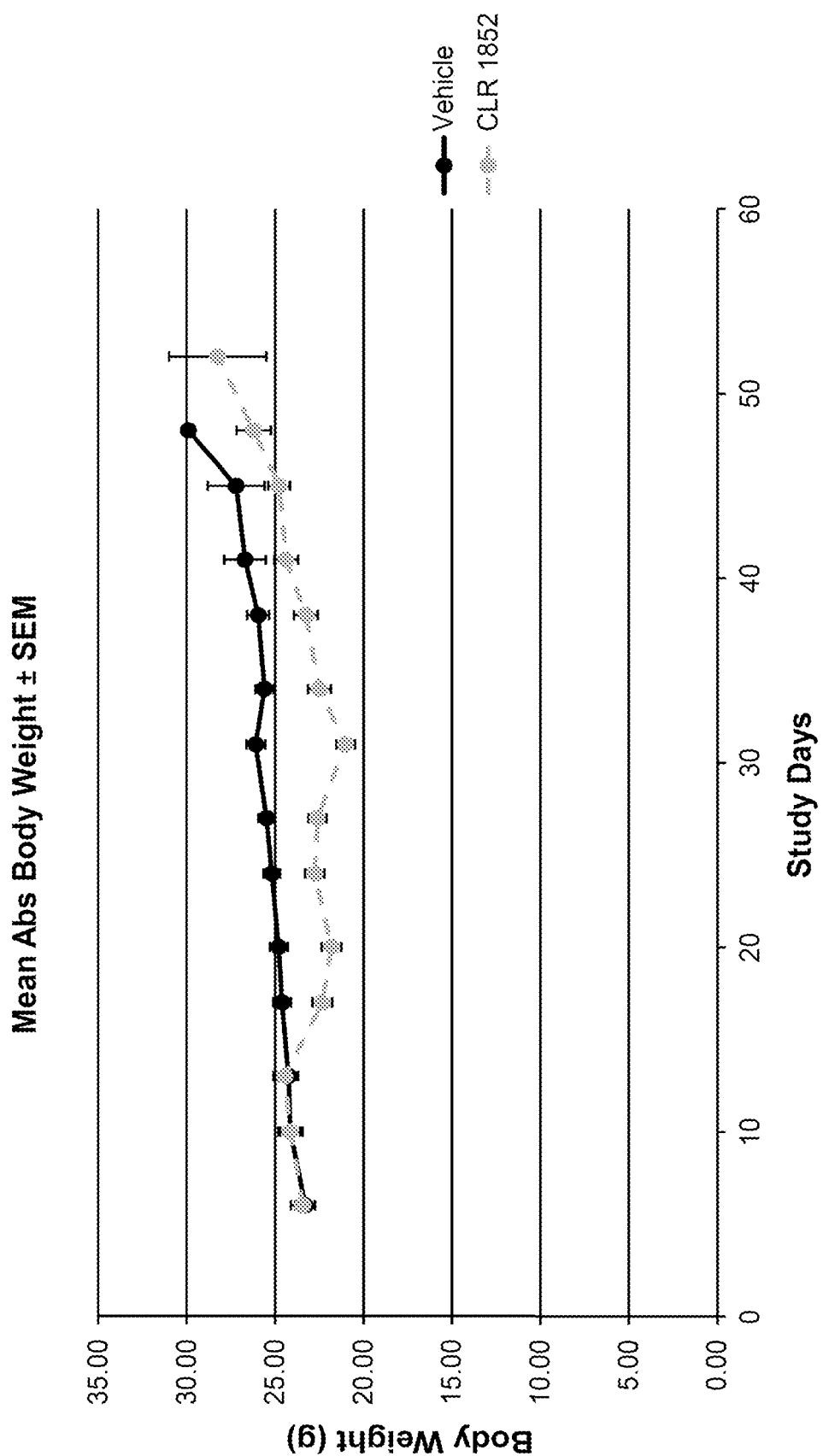
FIG. 10 is a graph of body weight versus time for vehicle compared to CLR 1852 (compound (9)) in a HCT 116 tumor model.

The efficacy for CLR 1852 in HCT 116 cells (human colon cancer) was examined. CLR 1852 was administered to HCT 116 cells in three doses of 1 mg/mg each. Compared to vehicle, CLR 1852 reduced the tumor volume beginning at around 27 days (FIG. 9). Compared to vehicle, CLR 1582 caused modest weight loss, presumably due to toxicity (FIG. 10). CLR 1582 provided at least a six-fold increase in tolerability compare to FLV3 alone (data not shown).

Figure 11:
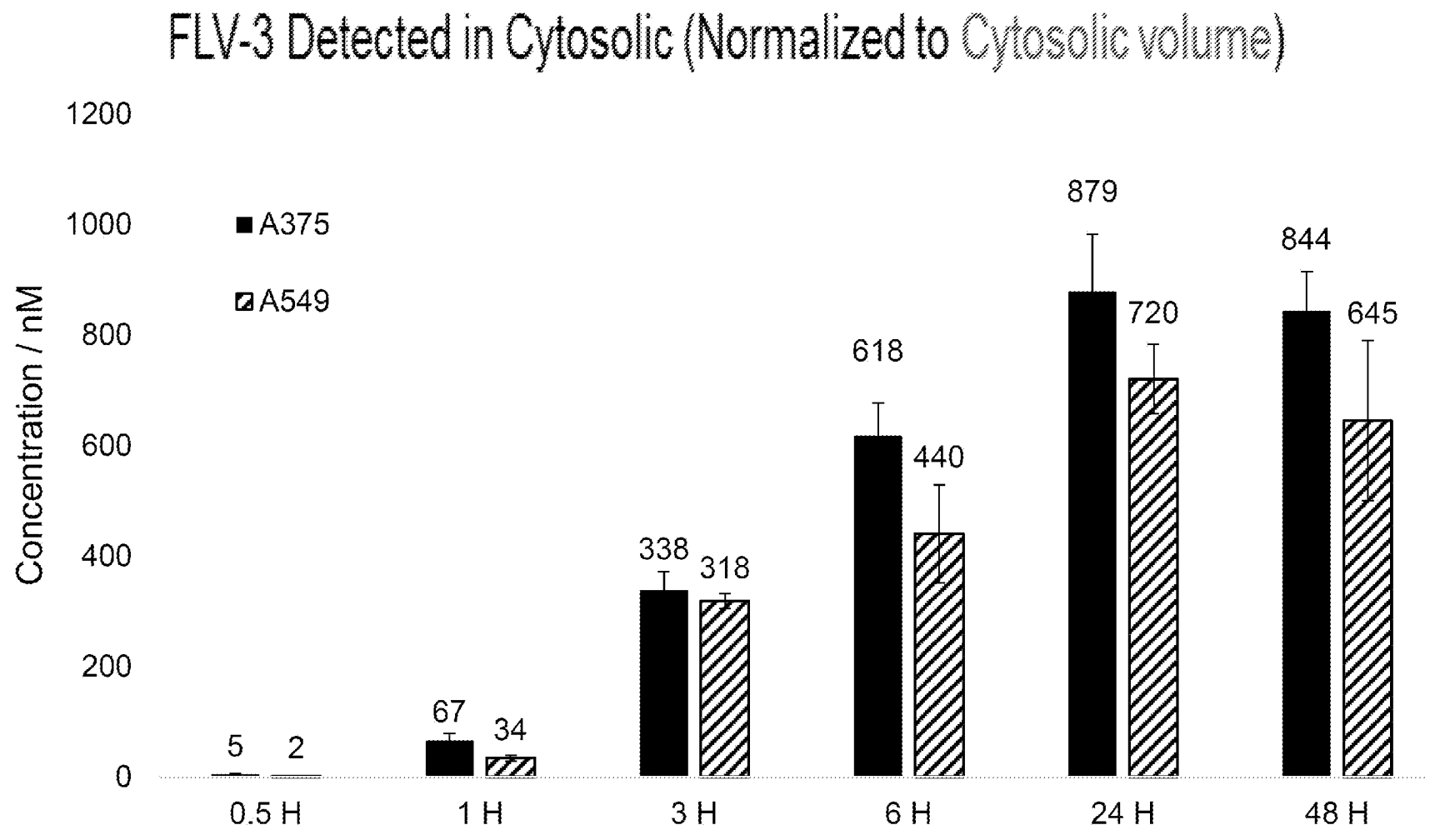

CLR 1852 and FLV3 alone were administered to A375 and A549 cells. The levels of FLV3 in cell lysate and growth media were measured using LC/MS. As shown in FIG. 11, high levels of FLV3 were present in the cell lysate after 24 hours. Moderate levels of FLV3 were present in the growth media after 24 hours. Levels of intracellular FLV3 appeared to plateau at 24 hours, while extracellular levels of FLV3 continued to increase.

The foregoing description of the specific aspects will so fully reveal the general nature of the invention that others can, by applying knowledge within the skill of the art, readily modify and/or adapt for various applications such specific aspects, without undue experimentation, without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary aspects, but should be defined only in accordance with the following claims and their equivalents.

All publications, patents, patent applications, and/or other documents cited in this application are incorporated by reference in their entirety for all purposes to the same extent as if each individual publication, patent, patent application, and/or other document were individually indicated to be incorporated by reference for all purposes.

For reasons of completeness, various aspects of the invention are set out in the following numbered clauses:

Clause 1. A phospholipid ether (PLE) according to Formula I, or a salt thereof:

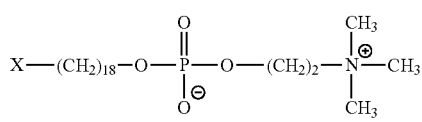
(I)

wherein X is hydrogen, methyl, or phenyl substituted with carboxyl.

Clause 2. The PLE of clause 1, selected from the following:

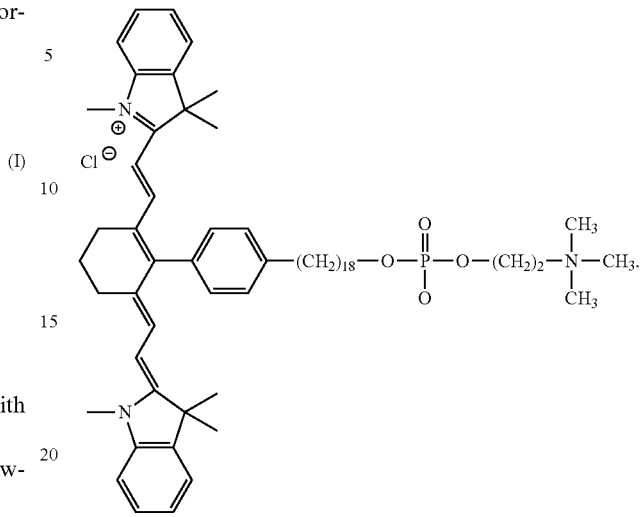
(2)

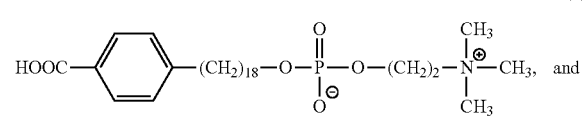
(3)

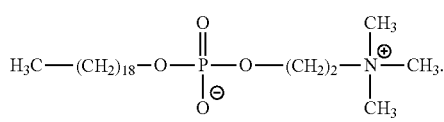
(6)

Clause 3. The PLE of clause 1 or 2, further comprising a detectable moiety attached thereto.

Clause 4. A composition comprising the PLE of clause 1 or 2 or 3 and a carrier.

Clause 5. A compound selected from the following:

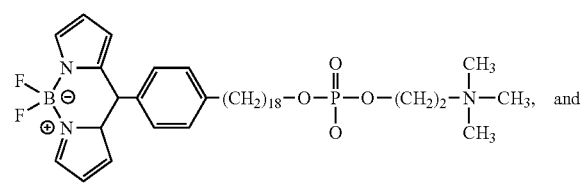
(1)

Clause 6. A composition comprising the compound of clause 5 and a carrier.

Clause 7. A conjugate according to Formula II, or a salt thereof:

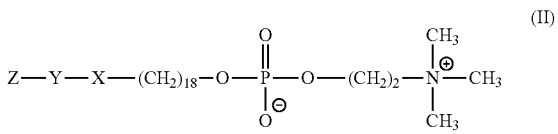
(II)

wherein X is,

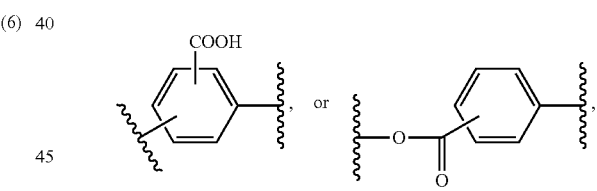

or methylene, or bond; Y is a linker comprising a disulfide; and Z is a flavagline anti-cancer drug.

Clause 8. The conjugate of clause 7, wherein the flavagline anti-cancer drug comprises FLV-1, FLV-3, a derivative or analog thereof, or a combination thereof.

Clause 9. The conjugate of any one of clauses 7-8, wherein the linker comprises the following:

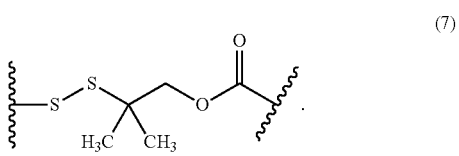 [SMILES: *SSC(C)(C)COC(*)=O]
(7)

Clause 10. The conjugate of any one of clauses 7-9, selected from the following:

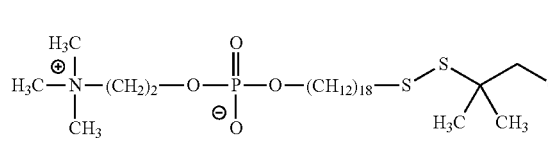
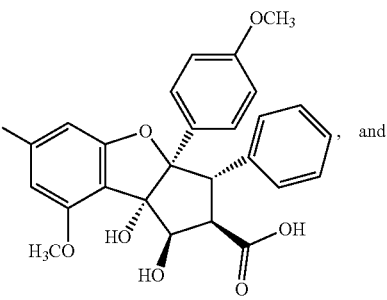

(8)

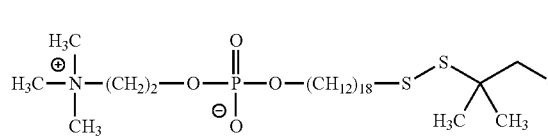
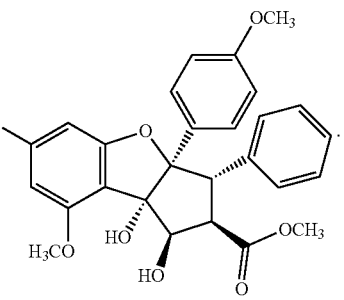

(9)

Clause 11. A composition comprising the conjugate of any one of clauses 7-10 and a pharmaceutically acceptable carrier.

Clause 12. A method of treating cancer in a subject, the method comprising administering to the subject the conjugate of any one of clauses 7-10.

Clause 13. A method of targeting a drug to a tumor or cancer cell in a subject, the method comprising administering to the subject the conjugate of any one of clauses 7-10.

Clause 14. The method of any one of clauses 12-13, wherein the flavagline anti-cancer drug localizes or travels to the cytoplasm or organelle of the tumor or cancer cell.

Clause 15. The method of any one of clauses 12-13, wherein the conjugate or flavagline anti-cancer drug is selective for cancer cells in the subject.

Clause 16. The method of any one of clauses 12-13, wherein the conjugate or flavagline anti-cancer drug is incorporated into at least about 2-fold more tumor or cancer cells than healthy cells.

Clause 17. The method of any one of clauses 12-16, wherein the cancer is selected from melanoma, brain cancer, lung cancer, adrenal cancer, liver cancer, renal or kidney cancer, pancreatic cancer, esophageal cancer, gastric cancer, stomach cancer, colon cancer, colorectal cancer, anal cancer, prostate cancer, ovarian cancer, breast cancer, cervical cancer, lymphoma, leukemia, myeloma, hematologic cancer, hepatocarcinoma, retinoblastoma, glioma, sarcoma, blastoma, squamous cell carcinoma, and adenocarcinoma.

Clause 18. The method of any one of clauses 12-17, wherein the subject is human.

The invention claimed is:

1. A conjugate according to Formula II, or a salt thereof:

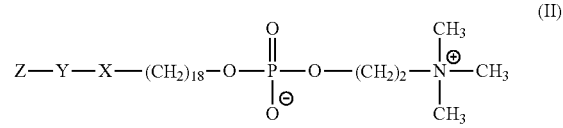

(II)

wherein X is,

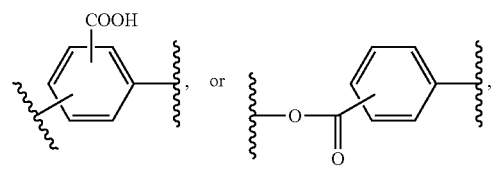

or methylene, or bond;
Y is a linker comprising a disulfide; and
Z is a flavagline anti-cancer drug.

2. The conjugate of claim 1, wherein the flavagline anti-cancer drug comprises FLV-1, FLV-3, a derivative or analog thereof, or a combination thereof.

3. The conjugate of claim 1, wherein the linker comprises the following:

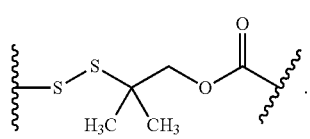

(7)

4. The conjugate of claim 1, selected from the following:

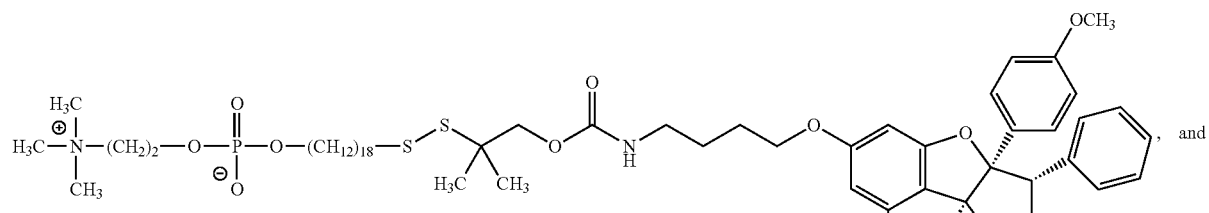

(8)

, and

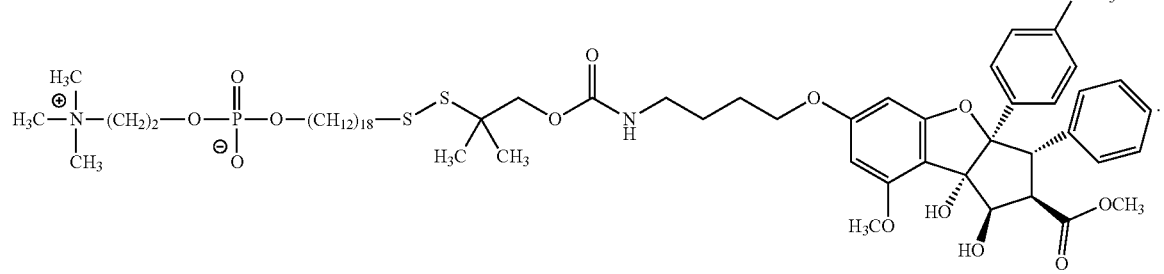

(9)

.

5. A composition comprising the conjugate of claim 1 and a pharmaceutically acceptable carrier.

6. A method of treating cancer in a subject, the method comprising administering to the subject the conjugate of claim 1.

7. A method of targeting a drug to a tumor or cancer cell in a subject, the method comprising administering to the subject the conjugate of claim 1.

8. The method of claim 6, wherein the flavagline anti-cancer drug localizes or travels to the cytoplasm or organelle of the tumor or cancer cell.

9. The method of claim 6, wherein the conjugate or flavagline anti-cancer drug is selective for cancer cells in the subject.

10. The method of claim 6, wherein the conjugate or flavagline anti-cancer drug is incorporated into at least about 2-fold more tumor or cancer cells than healthy cells.

11. The method of claim 6, wherein the cancer is selected from melanoma, brain cancer, lung cancer, adrenal cancer, liver cancer, renal or kidney cancer, pancreatic cancer, esophageal cancer, gastric cancer, stomach cancer, colon cancer, colorectal cancer, anal cancer, prostate cancer, ovarian cancer, breast cancer, cervical cancer, lymphoma, leukemia, myeloma, hematologic cancer, hepatocarcinoma, retinoblastoma, glioma, sarcoma, blastoma, squamous cell carcinoma, and adenocarcinoma.

12. The method of claim 6, wherein the subject is human.

* * * * *